(12) United States Patent
Lee

(10) Patent No.: US 12,439,159 B2
(45) Date of Patent: Oct. 7, 2025

(54) ACTUATOR FOR OPTICAL IMAGE STABILIZATION AND CAMERA MODULE INCLUDING ACTUATOR FOR OPTICAL IMAGE STABILIZATION

(71) Applicant: Samsung Electro-Mechanics Co., Ltd., Suwon-si (KR)

(72) Inventor: Kyung Hun Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 245 days.

(21) Appl. No.: 18/140,254

(22) Filed: Apr. 27, 2023

(65) Prior Publication Data

US 2024/0171860 A1    May 23, 2024

(30) Foreign Application Priority Data

Nov. 23, 2022 (KR) .................. 10-2022-0158726

(51) Int. Cl.
*H04N 23/68* (2023.01)
*G02B 7/02* (2021.01)
(Continued)

(52) U.S. Cl.
CPC .......... *H04N 23/687* (2023.01); *G02B 7/021* (2013.01); *G02B 27/646* (2013.01); *H04N 23/54* (2023.01); *H04N 23/55* (2023.01); *G03B 13/34* (2013.01)

(58) Field of Classification Search
CPC ...... H04N 23/687; H04N 23/54; H04N 23/55; H04N 23/00; H04N 23/57; H04N 23/60;
(Continued)

(56) References Cited

U.S. PATENT DOCUMENTS

2015/0201127 A1    7/2015 Ahn
2021/0014391 A1    1/2021 Uemura et al.
(Continued)

FOREIGN PATENT DOCUMENTS

KR    10-2014-0001640 A    1/2014
KR    10-2019-0091719 A    8/2019
(Continued)

OTHER PUBLICATIONS

Korean Office Action issued on Jul. 4, 2024, in counterpart Korean Patent Application No. 10-2022-0158726 (7 pages in English, 6 pages in Korean).
(Continued)

*Primary Examiner* — Yogesh K Aggarwal
(74) *Attorney, Agent, or Firm* — NSIP Law

(57) ABSTRACT

An actuator for optical image stabilization includes a fixed frame having an internal space; a moving frame disposed in the fixed frame and configured to be movable relative to the fixed frame; a first driving unit including a plurality of magnets disposed on the fixed frame, and a plurality of coils disposed on the moving frame and configured to be movable together with the moving frame relative to the fixed frame; and a sensor substrate including a moving part coupled to the moving frame and configured to be movable together with the moving frame relative to the fixed frame; and an extension substrate extending from one side of the sensor substrate and covering a portion of at least one surface of the fixed frame, wherein an image sensor is disposed on the moving part of the sensor substrate, and a control unit is disposed on the extension substrate.

21 Claims, 16 Drawing Sheets

(51) Int. Cl.
  *G02B 27/64*  (2006.01)
  *H04N 23/54*  (2023.01)
  *H04N 23/55*  (2023.01)
  *G03B 13/34*  (2021.01)

(58) Field of Classification Search
  CPC .... H04N 23/50; H04N 23/6812; G02B 7/021;
          G02B 27/646; G03B 13/34; G03B 5/00;
          G03B 5/04; G03B 2205/0069
  See application file for complete search history.

(56) References Cited

U.S. PATENT DOCUMENTS

| | | | |
|---|---|---|---|
| 2021/0048563 A1* | 2/2021 | Kim | G02B 3/14 |
| 2022/0353416 A1 | 11/2022 | Kwon et al. | |
| 2022/0407989 A1 | 12/2022 | Lee | |
| 2024/0244746 A1* | 7/2024 | Son | H04N 23/57 |

FOREIGN PATENT DOCUMENTS

| KR | 10-2021-0060035 A | 5/2021 |
|---|---|---|
| KR | 10-2022-0149424 A | 11/2022 |

OTHER PUBLICATIONS

Korean Office Action issued on Mar. 20, 2025, in counterpart Korean Patent Application No. 10-2022-0158726 (4 pages in English, 4 pages in Korean).

\* cited by examiner

ACTUATOR FOR OPTICAL IMAGE STABILIZATION AND CAMERA MODULE INCLUDING ACTUATOR FOR OPTICAL IMAGE STABILIZATION

CROSS-REFERENCE TO RELATED APPLICATIONS

This application claims the benefit under 35 USC 119(a) of Korean Patent Application No. 10-2022-0158726 filed on Nov. 23, 2022, in the Korean Intellectual Property Office, the entire disclosure of which is incorporated herein by reference for all purposes.

BACKGROUND

1. Field

The present disclosure relates to an actuator for optical image stabilization and a camera module including an actuator for optical image stabilization.

2. Description of Related Art

Recently, camera modules have been used in mobile communications terminals such as tablet personal computers (PC), laptop computers, and other terminals, as well as smartphones.

The camera modules typically include an actuator having a focus adjustment function and an optical image stabilization function in order to generate a high-resolution image.

For example, a focus is adjusted by moving a lens module in an optical axis (Z-axis) direction, and a shaking is corrected by moving the lens module in a direction perpendicular to the optical axis (Z-axis).

However, as the performance of the camera module has recently improved, a weight of the lens module has also increased, and a weight of a driving unit for moving the lens module is also affected, so it difficult to precisely control a driving force of the optical image stabilization.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an actuator for optical image stabilization includes a fixed frame having an internal space; a moving frame disposed in the internal space of the fixed frame and configured to be movable relative to the fixed frame; a first driving unit including a plurality of magnets disposed on the fixed frame, and a plurality of coils disposed on the moving frame and configured to be movable together with the moving frame relative to the fixed frame; and a sensor substrate including a moving part coupled to the moving frame and configured to be movable together with the moving frame relative to the fixed frame; and an extension substrate extending from one side of the sensor substrate and covering a portion of at least one surface of the fixed frame, wherein an image sensor is disposed on the moving part of the sensor substrate, and a control unit is disposed on the extension substrate.

The extension substrate includes a flexible part extending from the one side of the sensor substrate; and a mounting part connected to the flexible part, wherein the control unit may be disposed on one surface of the mounting part, and another surface of the mounting part on an opposite side of the mounting part from the one surface may be coupled to the fixed frame.

One surface of the fixed frame may include a groove, and the other surface of the mounting part may be coupled to the groove.

A shield can surrounding at least a portion of the control unit may be coupled to the one surface of the mounting part.

The sensor substrate may further include a fixed part spaced apart from the moving part and coupled to the fixed frame, and the extension substrate may extend from one side of the fixed part of the sensor substrate.

The actuator may further include a first ball unit disposed between the fixed frame and the moving frame; and a plurality of yokes facing the plurality of magnets disposed on the moving frame, and at least a portion of each of the plurality of yokes may be disposed inside the moving frame.

The actuator may further include a first ball unit disposed between the fixed frame and the moving frame, the moving frame may include a first frame in which the plurality of coils are disposed, and a second frame in which the first ball unit is disposed, and the first frame and the second frame may be made of a same plastic material or different plastic materials.

The actuator may further including a wiring pattern disposed inside the moving frame, wherein a portion of the wiring pattern mat connected to the plurality of coils, and another portion of the wiring pattern may be exposed to an outside of the second frame and may be connected to the sensor substrate.

The actuator may further include a support pad made of a material different from a material of the second frame and disposed inside the second frame, and one surface of the support pad may be exposed to an outside of the second frame and may contact the first ball unit.

The first driving unit may include a first sub-driving unit configured to generate a driving force in a first axis direction parallel to an imaging surface of the image sensor; and a second sub-driving unit configured to generate a driving force in a second axis direction perpendicular to the first axis direction and parallel to the imaging surface of the image sensor, the first sub-driving unit may include a first magnet disposed on the fixed frame, and a first coil disposed on the moving frame, and the second sub-driving unit may include a second magnet disposed on the fixed frame, and a second coil disposed on the moving frame.

Either one or both of the first magnet and the second magnet may include two magnets, either one or both of the first coil and the second coil may include two coils, and the actuator may further include two position sensors disposed at positions facing the two magnets.

The sensor substrate may further include a fixed part coupled to the fixed frame; and a connection part connecting the moving part to the fixed part, and the connection part may extend along a circumference of the moving part and may include a plurality of bridge elements spaced apart from each other.

The connection part may further include a first support part and a second support part, one side of the first support part may be connected to the moving part and another side of the first support part may be spaced apart from the fixed part, and one side of the second support part may be connected to the fixed part and another side of the second support part may be spaced apart from the moving part.

In another general aspect, a camera module includes a housing having an internal space; a lens module disposed in the internal space of the housing and disposed to be movable in an optical axis direction of the camera module; a fixed frame coupled to the housing and having a size larger than a size of the housing in a direction perpendicular to the optical axis direction; a moving frame configured to be movable relative to the fixed frame in a direction perpendicular to the optical axis direction; a first ball unit disposed between the fixed frame and the moving frame; a first driving unit including a plurality of magnets disposed on the fixed frame, and a plurality of coils disposed on the moving frame and configured to movable together with the moving frame relative to the fixed frame; and a sensor substrate including a moving part having an image sensor disposed thereon and coupled to the moving frame; a fixed part spaced apart from the moving part and coupled to the fixed frame; and an extension substrate having a control unit disposed therein and extending from the fixed part of the sensor substrate and covering a portion of at least one surface of the fixed frame.

The extension substrate may include a flexible part extending from the fixed part, and a mounting part connected to the flexible part and on which the control unit is disposed, the mounting part may be coupled to the fixed frame, a shield can surrounding at least a portion of the control unit may be coupled to the mounting part, and the control unit may be a driver IC.

The plurality of coils and the sensor substrate may be electrically connected to each other by a wiring pattern disposed inside the moving frame.

The lens module may include a first guide unit protruding in the optical axis direction, the housing may include a second guide part protruding in the optical axis direction and accommodating the first guide part, a second ball unit may be disposed between surfaces of the first guide part and the second guide part facing in a direction perpendicular to the optical axis direction, and the fixed frame may include a recess in which the second guide part is disposed.

In another general aspect, an actuator for optical image stabilization includes a fixed frame having an internal space; a moving frame disposed in the internal space of the fixed frame and configured to be movable relative to the fixed frame; a first driving unit including a plurality of magnets disposed on the fixed frame, and a plurality of coils disposed on the moving frame and configured to be movable together with the moving frame relative to the fixed frame; and a sensor substrate opposing the fixed frame in an optical axis direction and including a moving part having an image sensor disposed thereon, coupled to the moving frame, and configured to be movable together with the moving frame relative to the fixed frame; and an extension substrate having a control unit disposed thereon, extending from one side of the sensor substrate in one direction perpendicular to the optical axis direction, and bent to cover a portion of one side surface of the fixed frame extending in a direction parallel to the optical axis direction.

The extension substrate may be further bent to extend in a direction opposite to the one direction perpendicular to the optical axis direction and cover a portion of a surface of the fixed frame that is perpendicular to the optical axis direction and is adjacent to the portion of the one side surface of the fixed frame covered by the extension substrate.

The control unit may be disposed on a portion of the extension substrate covering the portion of the surface of the fixed frame that is perpendicular to the optical axis direction, and the portion of the extension substrate on which the control unit is mounted may be coupled to the portion of the surface of the fixed frame that is perpendicular to the optical axis direction.

The first driving unit may include a first sub-driving unit configured to generate a driving force in a first axis direction parallel to an imaging surface of the image sensor; and a second sub-driving unit configured to generate a driving force in a second axis direction perpendicular to the first axis direction and parallel to the imaging surface of the image sensor, the first sub-driving unit may include a first magnet disposed on the fixed frame, and a first coil disposed on the moving frame, and the second sub-driving unit may include a second magnet disposed on the fixed frame, and a second coil disposed on the moving frame, and the control unit may be configured to control the first sub-driving unit and the second sub-driving unit to perform the optical image stabilization.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
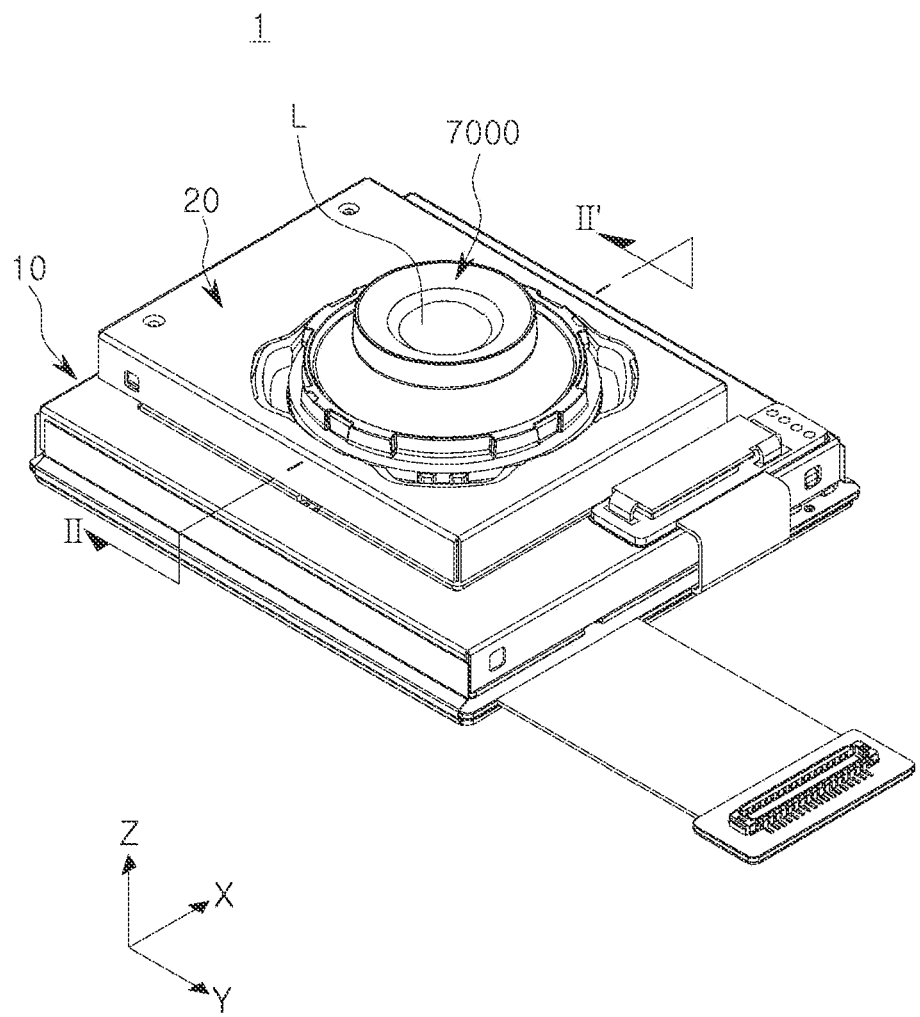
FIG. 1 is a perspective view illustrating a camera module according to an embodiment in the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated by 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

An actuator for optical image stabilization and a camera module including the actuator according to an embodiment in the present disclosure may be installed in a portable electronic device. The portable electronic device may be a portable electronic device such as a mobile communications terminal, a smart phone, or a tablet PC.

Figure 2:
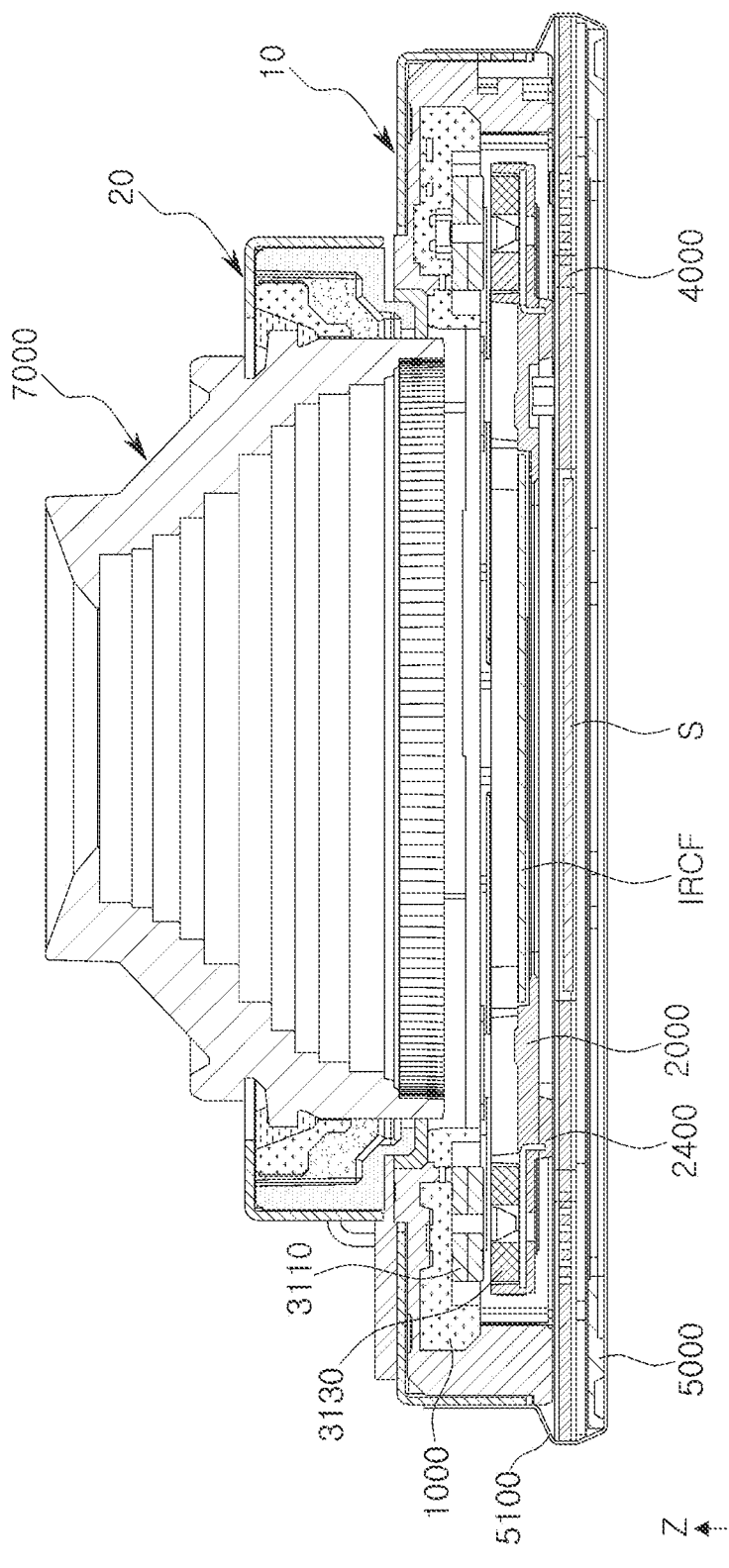
FIG. 2 is a cross-sectional view taken along the line Ill l' of FIG. 1.
Figure 3:
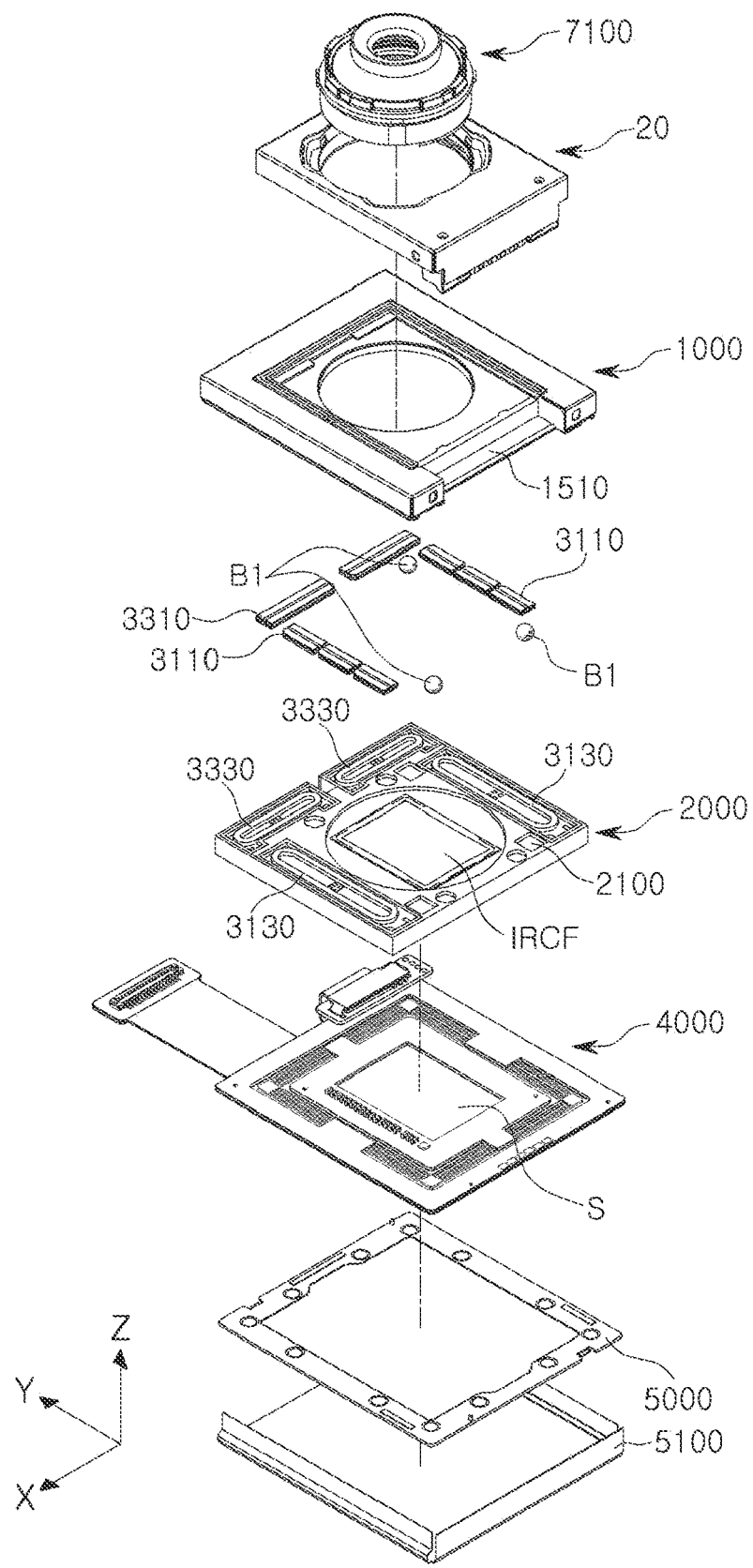
FIG. 3 is a schematic exploded perspective view illustrating the camera module of FIG. 1.
Figure 4:
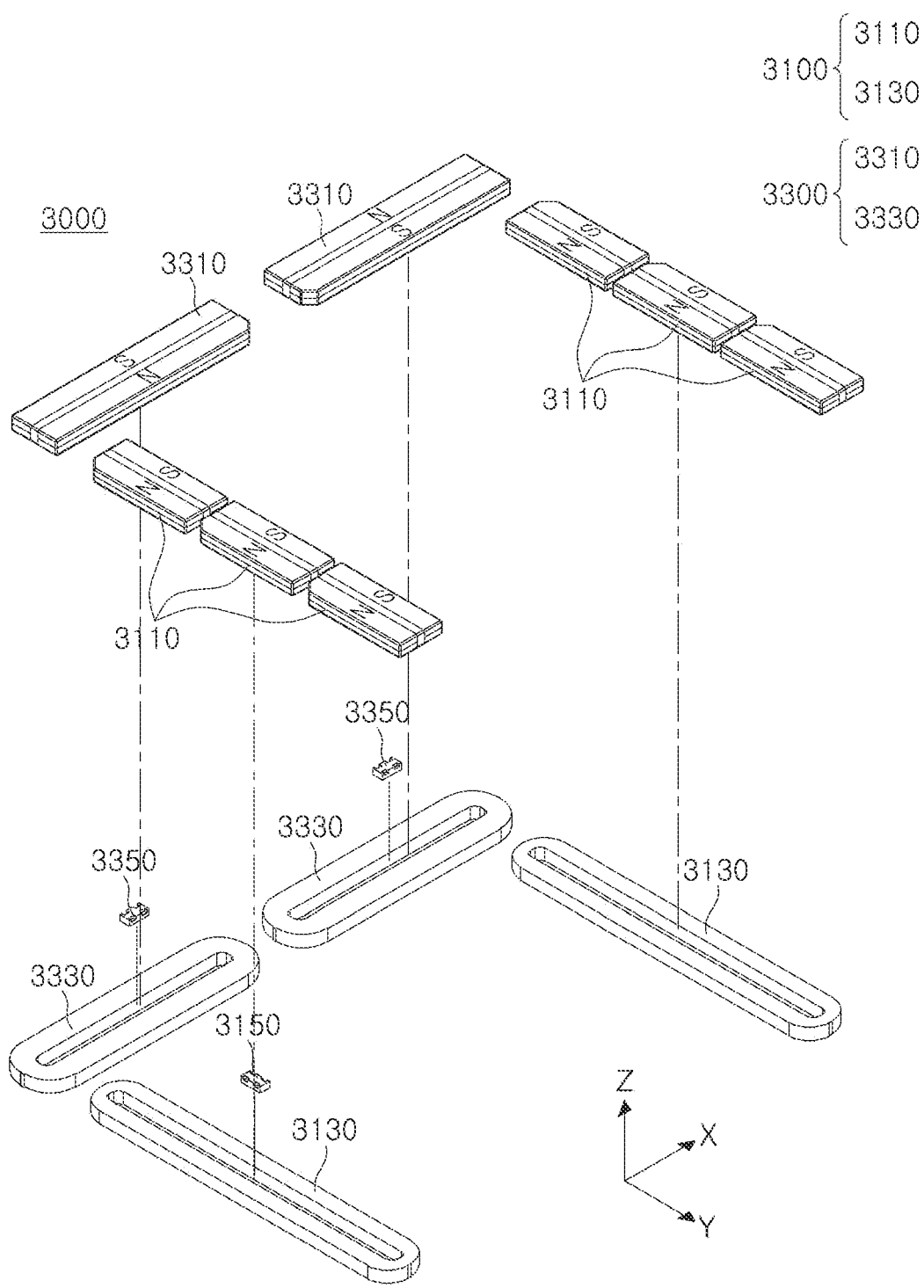
FIG. 4 is an exploded perspective view of a first driving unit of a first actuator of the camera module of FIG. 1.

FIG. 1 is a perspective view of a camera module according to an embodiment in the present disclosure, FIG. 2 is a cross-sectional view taken along the line II-II' of FIG. 1, FIG. 3 is a schematic exploded perspective view of the camera module of FIG. 1, and FIG. 4 is an exploded perspective view of a first driving unit of a first actuator of the camera module of FIG.

Referring to FIGS. 1 through 4, a camera module 1 according to an embodiment in the present disclosure includes a lens module 7000, an image sensor S, a first actuator 10, and a second actuator 20.

The first actuator 10 is an actuator for optical image stabilization, and the second actuator 20 is an actuator for focus adjustment.

The lens module 7000 includes at least one lens L and a lens barrel 7100. At least one lens is disposed inside the lens barrel 7100. When a plurality of lenses L are provided, the plurality of lenses L are mounted inside the lens barrel 7100 along an optical axis (Z-axis).

The lens module 7000 may further include a carrier 7300 (see FIG. 15) coupled to the lens barrel 7100.

The carrier 7300 may include an opening penetrating through the carrier 7300 in the optical axis (Z-axis) direction, and the lens barrel 7100 is inserted into the opening and fixedly disposed with respect to the carrier 7300.

In an embodiment in the present disclosure, the lens module 7000 is a moving member that is moved in the optical axis (Z-axis) direction during autofocus adjustment (AF). To this end, the camera module 1 according to an embodiment in the present disclosure includes the second actuator 20.

The lens module 7000 may be moved in the optical axis (Z-axis) direction by the second actuator 20 to adjust the focus.

Meanwhile, the lens module 7000 is a fixed member that is not moved during optical image stabilization.

The camera module 1 according to the embodiment in the present disclosure may perform optical image stabilization (OIS) by moving the image sensor S instead of the lens module 7000. Since the relatively light image sensor S is moved, the image sensor S may be moved with a smaller driving force. Therefore, it is possible to more precisely perform the optical image stabilization.

To this end, the camera module 1 according to the embodiment in the present disclosure may include the first actuator 10.

The image sensor S may be moved in a direction perpendicular to the optical axis (Z-axis) by the first actuator 10 or rotated about the optical axis (Z-axis) as a rotational axis to perform the optical image stabilization.

That is, the image sensor S may be moved in a direction perpendicular to a direction in which an imaging surface of the image sensor S faces by the first actuator 10. For example, the image sensor S may be moved in the direction perpendicular to the optical axis (Z-axis) or be rotated about the optical axis (Z-axis) as the rotational axis to perform the optical image stabilization.

For convenience, it has been described that the image sensor S is rotated about the optical axis (Z-axis) as the rotational axis, but when the image sensor S is rotated, the rotational axis of the image sensor S may not coincide with the optical axis (Z-axis). For example, the image sensor S may be rotated about, as the rotational axis, any axis perpendicular to the direction in which the imaging surface of the image sensor S faces.

Referring to FIG. 3, the first actuator 10 includes a fixed frame 1000, a moving frame 2000, a first driving unit 3000 (see FIG. 4), a sensor substrate 4000, and a base 5000.

The fixed frame 1000 is coupled to the second actuator 20 to be described later with respect to FIGS. 15-18. For example, the fixed frame 1000 may be coupled to a housing 6000 of the second actuator 20.

The fixed frame 1000 is a fixed member that is not moved during the focus adjustment and the optical image stabilization.

The fixed frame 1000 may have a rectangular plate shape with an opening penetrating through the center in the optical axis (Z-axis) direction.

The moving frame 2000 is accommodated in the fixed frame 1000. The fixed frame 1000 has a sidewall extending downwardly in the optical axis (Z-axis) direction, and thus the fixed frame 1000 may have an accommodation space for accommodating the moving frame 2000.

The moving frame 2000 may be relatively moved with respect to the fixed frame 1000 in a direction perpendicular to the optical axis (Z-axis) direction or rotated about the optical axis (Z-axis) as the rotational axis. That is, the moving frame 2000 is a moving member that is moved during the optical image stabilization.

For example, the moving frame 2000 is configured to be movable in a first axis (X-axis) direction and a second axis (Y-axis) direction perpendicular to the optical axis (Z-axis) direction, and may be rotated about the optical axis (Z-axis) as the rotational axis.

The first axis (X-axis) direction may mean a direction perpendicular to the optical axis (Z-axis), and the second axis (Y-axis) direction may mean a direction perpendicular to both the optical axis (Z-axis) direction and the first axis (X-axis) direction.

The moving frame 2000 may have a rectangular plate shape with an opening penetrating through the center in the optical axis (Z-axis) direction.

An infrared cut filter (IRCF) may be mounted on an upper surface of the moving frame 2000. The sensor substrate 4000 may be mounted on a lower surface of the moving frame 2000.

A first ball unit B1 is disposed between the fixed frame 1000 and the moving frame 2000.

The first ball unit B1 is disposed to contact the fixed frame 1000 and the moving frame 2000.

When the moving frame 2000 is relatively moved or rotated with respect to the fixed frame 1000, the first ball unit B1 rolls between the fixed frame 1000 and the moving frame 2000 to support the movement of the moving frame 2000.

Referring to FIG. 3, the image sensor S is mounted on the sensor substrate 4000. A portion of the sensor substrate 4000 is coupled to the moving frame 2000. Also, another portion of the sensor substrate 4000 may be coupled to the fixed frame 1000. As another example, it is also possible that the other portion of the sensor substrate 4000 is coupled to the base 5000.

The image sensor S is mounted on the portion of the sensor substrate 4000 coupled to the moving frame 2000.

Since the portion of the sensor substrate 4000 is coupled to the moving frame 2000, as the moving frame 2000 is moved or rotated, the portion of the sensor substrate 4000 may also be moved or rotated together with the moving frame 2000.

Accordingly, the image sensor S may be moved or rotated on a plane perpendicular to the optical axis (Z-axis) to perform OIS during photographing.

The first driving unit 3000 may generate a driving force in a direction perpendicular to the optical axis (Z-axis) to move the moving frame 2000 in the direction perpendicular to the optical axis (Z-axis) or rotate the moving frame 2000 about the optical axis (Z-axis) as the rotational axis.

The first driving unit 3000 includes a first sub-driving unit 3100 (see FIG. 4) and a second sub-driving unit 3300 (see FIG. 4). The first sub-driving unit 3100 may generate a driving force in the first axis (X-axis) direction, and the second sub-driving unit 3300 may generate a driving force in the second axis (Y-axis) direction.

The first sub-driving unit 3100 includes a first magnet 3110 and a first coil 3130. The first magnet 3110 and the first coil 3130 may be disposed to face each other in the optical axis (Z-axis) direction.

The first magnet 3110 is disposed on the fixed frame 1000. The first magnet 3110 may include a plurality of magnets. For example, the first magnet 3110 may include two sets of magnets spaced apart from each other in the direction (first axis (X-axis) direction) in which the driving force is generated by the first sub-driving unit 3100. At least two magnets may be included in each set. Each set include three magnets in the embodiment in FIG. 3. The magnets included in each set may be spaced apart from each other in the second axis (Y-axis) direction.

It is also possible to use one magnet having a long shape in the second axis (Y-axis) direction, but when the magnet has a shape that is too long on one side, there may be a risk of damage during manufacturing. Accordingly, reliability during manufacturing may be improved by arranging a plurality of magnets spaced apart from each other along a longitudinal direction as a set.

The fixed frame 1000 may be provided with a mounting groove in which the first magnet 3110 is disposed. By inserting and disposing the first magnet 3110 into the mounting groove, it is possible to prevent the overall height of the first actuator 10 and the camera module 1 from increasing due to a thickness of the first magnet 3110.

One surface (e.g., a surface facing the first coil 3130) of the first magnet 3110 may be magnetized to have both an N pole and an S pole. For example, an N pole, a neutral region, and an S pole may be sequentially arranged on the one surface of the first magnet 3110 facing the first coil 3130 in the first axis (X-axis) direction. The first magnet 3110 has a shape having a length in the second axis (Y-axis) direction (see FIG. 4).

The other surface (e.g., the opposite surface of one surface) of the first magnet 3110 may be magnetized to have both an S pole and an N pole. For example, an S pole, a neutral region, and an N pole may be sequentially arranged on the other surface of the first magnet 3110 in the first axis (X-axis) direction so that the S pole on the other surface opposes the N pole on the one surface, and the N pole on the other surface opposes the S pole on the one surface.

All magnetization directions of polarities of the plurality of magnets included in the first magnet 3110 may be the same (see FIG. 4).

The first coil 3130 is disposed to face the first magnet 3110. For example, the first coil 3130 may be disposed to face the first magnet 3110 in the optical axis (Z-axis) direction.

The first coil 3130 has a donut shape having an opening in the center and a length in the second axis (Y-axis) direction. The first coil 3130 includes a smaller number of coils than the number of magnets included in the first magnet 3110. For example, the first coil 3130 may include two coils spaced apart from each other in the direction (a first axis (X-axis direction)) in which the driving force is generated by the first sub-driving unit 3100, and each coil may be disposed to face the magnets of each set of the first magnet 3110.

The moving frame 2000 may be provided with a mounting groove in which the first coil 3130 is disposed. By inserting and disposing the first coil 3130 into the mounting groove, it is possible to prevent the overall height of the second actuator 20 and the camera module 1 from increasing due to the thickness of the first coil 3130.

During the optical image stabilization, the first magnet 3110 is a fixed member fixed to the fixed frame 1000, and the first coil 3130 is a moving member that is mounted on the moving frame 2000 and moved together with the moving frame 2000.

When power is applied to the first coil 3130, the moving frame 2000 may be moved in the first axis (X-axis) direction by an electromagnetic force generated between the first magnet 3110 and the first coil 3130.

The first magnet 3110 and the first coil 3130 may generate the driving force in the direction (e.g., a first axis (X-axis) direction) perpendicular to the direction (the optical axis (Z-axis) direction) in which the first magnet 3110 and the first coil 3130 face each other.

The second sub-driving unit 3300 includes a second magnet 3310 and a second coil 3330. The second magnet 3310 and the second coil 3330 may be disposed to face each other in the optical axis (Z-axis) direction.

The second magnet 3310 is disposed on the fixed frame 1000. The second magnet 3310 may include a plurality of magnets. For example, the second magnet 3310 may include two magnets, and the two magnets may be spaced apart from each other in the first axis (X-axis) direction. For example, the second magnet 3310 may include two sets of magnets spaced apart from each other in the direction perpendicular to the direction (a second axis (Y-axis) direction) in which the driving force is generated by the second sub-driving unit 3300.

The fixed frame 1000 may be provided with a mounting groove in which the second magnet 3310 is disposed. By inserting and disposing the second magnet 3310 into the mounting groove, it is possible to prevent the overall height of the first actuator 10 and the camera module 1 from increasing due to the thickness of the second magnet 3310.

One surface (e.g., a surface facing the second coil 3330) of the second magnet 3310 may be magnetized to have both an S pole and an N pole. For example, an S pole, a neutral region, and an N pole may be sequentially arranged on one surface of the second magnet 3310 facing the second coil 3330 in the second axis (Y-axis) direction (see FIG. 4). The second magnet 3310 has a shape having a length in the first axis (X-axis) direction.

The other surface (e.g., the opposite surface of one surface) of the second magnet 3310 may be magnetized to have both an N pole and an S pole. For example, an N pole, a neutral region, and an S pole may be sequentially arranged on the other surface of the second magnet 3310 in the second axis (Y-axis) direction so that the N pole on the other surface opposes the S pole on the one surface, and the S pole on the other surface opposes the N pole on the one surface.

The magnetization directions of the two magnets of the second magnet 3310 may be opposite to each other (see FIG. 4).

The second coil 3330 is disposed to face the second magnet 3310. For example, the second coil 3330 may be disposed to face the second magnet 3310 in the optical axis (Z-axis) direction.

The second coil 3330 has a donut shape having an opening in the center and a length in the first axis (X-axis) direction. The second coil 3330 includes a number of coils corresponding to the number of magnets included in the second magnet 3310.

The moving frame 2000 may be provided with a mounting groove in which the second coil 3330 is disposed. By inserting and disposing the second coil 3330 into the mounting groove, it is possible to prevent the overall height of the second actuator 20 and the camera module 1 from increasing due to the thickness of the second coil 3330.

During the optical image stabilization, the second magnet 3310 is a fixed member fixed to the fixed frame 1000, and the second coil 3330 is a moving member that is mounted on the moving frame 2000 and moved together with the moving frame 2000.

When power is applied to the second coil 3330, the moving frame 2000 may be moved in the second axis (Y-axis) direction by an electromagnetic force generated between the second magnet 3310 and the second coil 3330.

The second magnet 3310 and the second coil 3330 may generate the driving force in the direction (e.g., a second axis (Y-axis) direction) perpendicular to the direction (the optical axis (Z-axis) direction) in which the second magnet 3310 and the second coil 3330 face each other.

Meanwhile, the moving frame 2000 may be rotated by the first sub-driving unit 3100 and the second sub-driving unit 3300.

For example, a rotational force may be generated by controlling the driving force of the first sub-driving unit 3100 and the driving force of the second sub-driving unit 3300 to rotate the moving frame 2000.

The first magnet 3110 and the second magnet 3310 are disposed perpendicular to each other in a plane perpendicular to the optical axis (Z-axis), and the first coil 3130 and the second coil 3330 are also disposed perpendicular to each other in a plane perpendicular to the optical axis (Z-axis).

The first ball unit B1 is disposed between the fixed frame 1000 and the moving frame 2000.

The first ball unit B1 is disposed to contact the fixed frame 1000 and the moving frame 2000, respectively.

The first ball unit B1 functions to guide the movement of the moving frame 2000 during the optical image stabilization. In addition, the first ball unit B1 also functions to maintain a distance between the fixed frame 1000 and the moving frame 2000.

The first ball members B1 may roll in the first axis (X-axis) direction when the driving force in the first axis (X-axis) direction is generated. Accordingly, the first ball unit B1 guides the movement of the moving frame 2000 in the first axis (X-axis) direction.

In addition, the first ball unit B1 may roll in the second axis (Y-axis) direction when the driving force in the second axis (Y-axis) direction is generated. Accordingly, the first ball unit B1 guides the movement of the moving frame 2000 in the second axis (Y-axis) direction.

The first ball unit B1 includes a plurality of balls disposed between the fixed frame 1000 and the moving frame 2000.

At least one of the surfaces of the fixed frame 1000 and the moving frame 2000 facing each other in the direction of the optical axis (Z-axis) are provided with a guide groove in which the first ball unit B1 is disposed. A plurality of guide grooves are provided to correspond to the plurality of balls of the first ball unit B1.

For example, a first guide groove (not shown) may be provided on a lower surface of the fixed frame 1000, and a second guide groove 2100 may be provided on the upper surface of the moving frame 2000.

The first ball unit B1 is disposed in the first guide groove and the second guide groove 2100 and is inserted between the fixed frame 1000 and the moving frame 2000.

Each of the first guide groove and the second guide groove 2100 may have a polygonal or circular planar shape. The size of the first guide groove and the second guide groove 2100 is larger than a diameter of the first ball unit B1. For example, cross sections of the first guide groove and the second guide groove 2100 on a plane perpendicular to the optical axis (Z-axis) may have a size larger than the diameter of the first ball unit B1.

The specific shape of the first guide groove and the second guide groove 2100 is not limited as long as the size is larger than the diameter of the first ball unit B1.

Accordingly, the first ball unit B1 may roll in any direction perpendicular to the optical axis (Z-axis) while being accommodated in the first guide groove and the second guide groove 2100.

Meanwhile, each of the fixed frame 1000 and the moving frame 2000 may include a support pad (not shown), and at least a portion of the support pad may form bottom surfaces of the first guide groove and the second guide groove 2100. Therefore, the first ball unit B1 may roll in contact with the support pad.

The support pad may be integrally coupled to the fixed frame 1000 and the moving frame 2000 by an insert injection molding operation. In this case, the support pad may be manufactured to be integrated with the fixed frame 1000 and the moving frame 2000 by injecting a resin material into a mold while the support pad is fixed in the mold.

The support pad may be made of a material different from a material of the fixed frame 1000 and the moving frame 2000. For example, the support pad may be made of a non-magnetic metal material (e.g., stainless steel).

When the driving force is generated in the first axis (X-axis) direction, the moving frame 2000 is moved in the first axis (X-axis) direction.

In addition, when the driving force is generated in the second axis (Y-axis) direction, the moving frame 2000 is moved in the second axis (Y-axis) direction.

In addition, the moving frame 2000 may be rotated by generating a deviation between the magnitude of the driving force in the first axis (X-axis) direction and the magnitude of the driving force in the second axis (Y-axis) direction.

Since a portion of the sensor substrate 4000 is coupled to the moving frame 2000 and the image sensor S is disposed on the sensor substrate 4000, eventually, as the moving frame 2000 moves or rotates, the image sensor S may also be moved or rotated.

Meanwhile, referring to FIG. 2, a protrusion 2400 protruding toward the sensor substrate 4000 may be disposed on the moving frame 2000. For example, the protrusion 2400 may be disposed on the lower surface of the moving frame 2000, and the protrusion 2400 may be coupled to a moving part 4100 (see FIG. 11) of the sensor substrate 4000. Therefore, a gap is formed in the optical axis (Z-axis) direction between a body of the moving frame 2000 and the sensor substrate 4000, so the moving frame 2000 may be prevented from interfering with the sensor substrate 4000 when the moving frame 2000 is moved on the X-Y plane.

In FIG. 2, the protrusion 2400 may be disposed on the lower surface of the moving frame 2000, but this is only an example, and the protrusion 2400 may alternatively be disposed on an upper surface of the moving part 4100 of the sensor substrate 4000.

The first actuator 10 may detect a position of the moving frame 2000 in a direction perpendicular to the optical axis (Z-axis).

Figure 10:
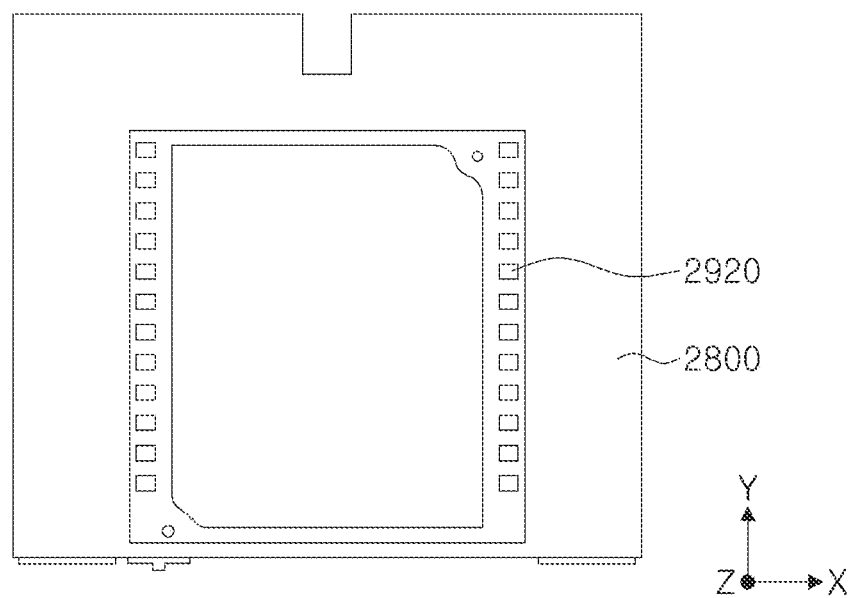
FIG. 10 is a bottom view of the moving frame of FIG. 3.

To this end, a first position sensor 3150 and a second position sensor 3350 are provided (see FIG. 10). The first position sensor 3150 is disposed on the moving frame 2000 to face the first magnet 3110, and the second position sensor 3350 is disposed on the moving frame 2000 to face the second magnet 3310. The first position sensor 3150 and the second position sensor 3350 may be Hall sensors.

The second position sensor 3350 may include two Hall sensors. For example, the second magnet 3310 includes two magnets spaced apart from each other in the direction (first axis (X-axis) direction) perpendicular to the direction (second axis (Y-axis) direction) in which the driving force is generated by the second sub-driving unit 3300, and the second position sensor 3350 includes two Hall sensors disposed to face the two magnets.

It is possible to detect whether the moving frame 2000 is rotated through the two Hall sensors of the second position sensor 3350 facing the two magnets of the second magnet 3310.

Meanwhile, a rotational force may be generated by a method of generating a deviation between the driving force generated by the first sub-driving unit 3100 and the driving force generated by the second sub-driving unit 3300, using a resultant force of the first sub-driving unit 3100 and the second sub-driving unit 3300, using two magnets and two coils included in the second sub-driving unit 3300, or other methods.

Since the first guide groove and the second guide groove 2100 have a polygonal or circular shape having a planar shape larger than the diameter of the first ball unit B1, the first ball unit B1 disposed between the first guide groove and the second guide groove 2100 may roll in any direction perpendicular to the optical axis (Z-axis) without restriction.

Accordingly, the moving frame 2000 may be rotated about the optical axis (Z-axis) while being supported by the first ball unit B1.

In addition, when rotation is not required and linear movement is required, the driving force of the first sub-driving unit 3100 and/or the driving force of the second sub-driving unit 3300 may be controlled to offset any unintentionally generated rotational force.

Figure 5:
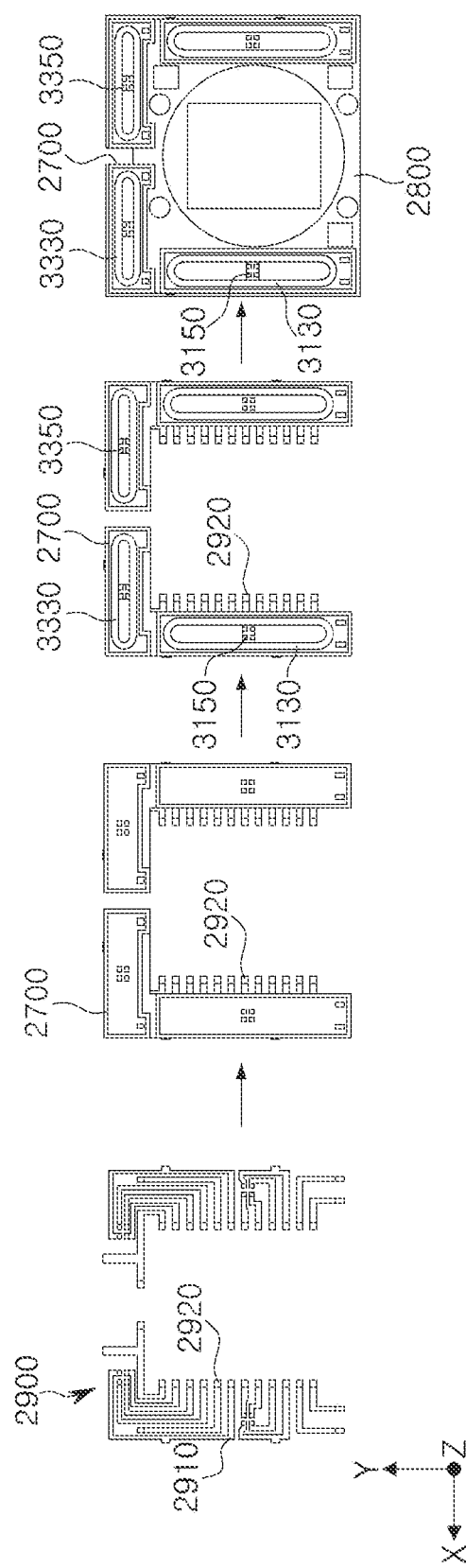
FIG. 5 is a diagram illustrating a process of manufacturing a moving frame of FIG. 3.
Figure 6:
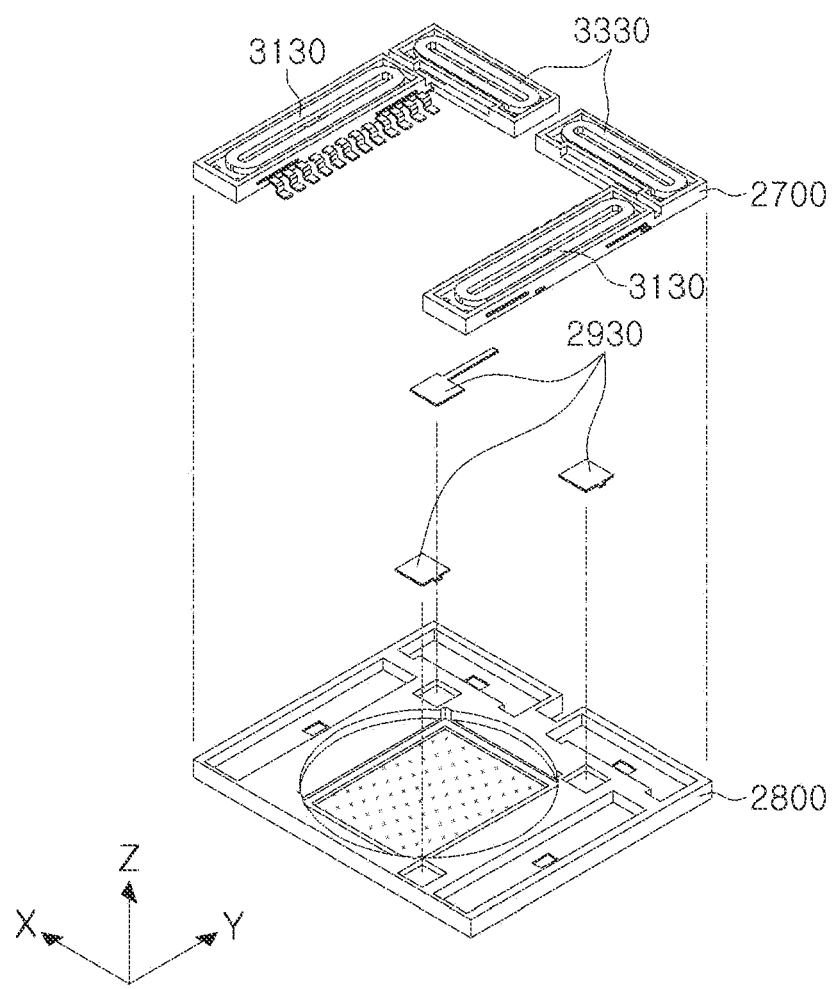
FIG. 6 is an exploded perspective view of the moving frame of FIG. 3.

FIG. 5 is a diagram illustrating a process of manufacturing a moving frame of FIG. 3, and FIG. 6 is an exploded perspective view of the moving frame of FIG. 3.

Figure 7:
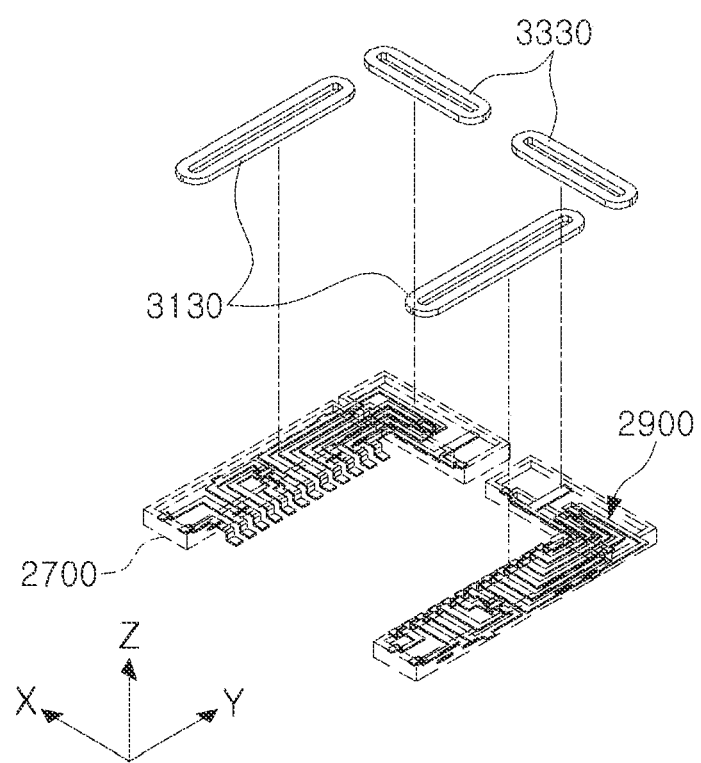
FIGS. 7 and 8 are partially exploded perspective views of the moving frame of FIG. 3.
Figure 8:
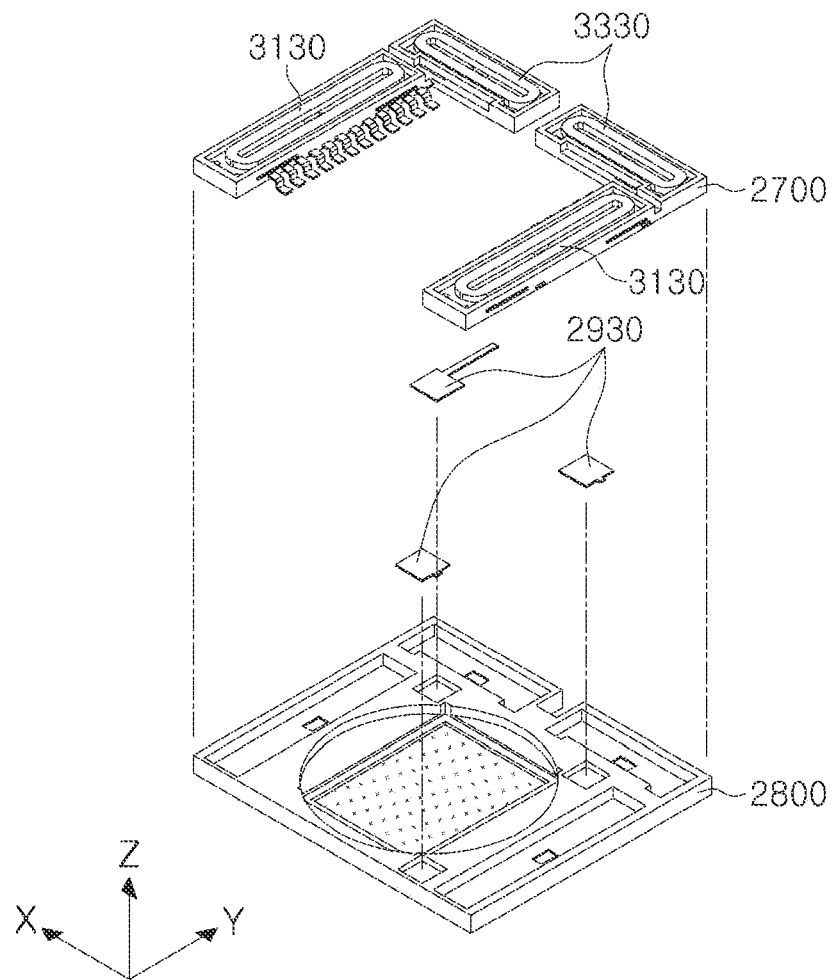

In addition, FIGS. 7 and 8 are partially exploded perspective views of the moving frame of FIG. 3.

Figure 9:
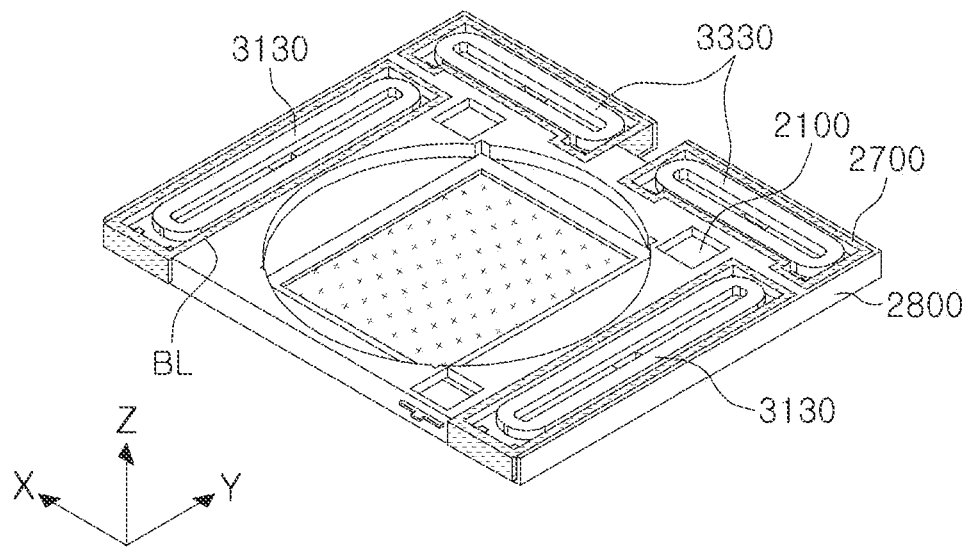
FIG. 9 is a perspective view of the moving frame of FIG. 3.

In addition, FIG. 9 is a perspective view of the moving frame of FIG. 3, and FIG. 10 is a bottom view of the moving frame of FIG. 3.

Referring to FIGS. 5 through 10, the first coil 3130 and the second coil 3330 are disposed in mounting grooves provided in the moving frame 2000, and a wiring pattern 2900 is disposed inside the moving frame 2000. The wiring pattern 2900 may be connected to the first coil 3130 and the second coil 3330.

Also, the wiring pattern 2900 of the moving frame 2000 may be connected to the sensor substrate 4000. Accordingly, the first coil 3130 and the second coil 3330 may receive power through the wiring pattern 2900 disposed on the moving frame 2000.

That is, the camera module 1 does not have a separate printed circuit board for supplying power to the first driving unit 3000, and is configured to supply power to the first driving unit 3000 by providing the wiring pattern 2900 in the moving frame 2000 itself.

The wiring pattern 2900 may be integrally coupled to the moving frame 2000 by an insert injection molding operation. For example, the wiring pattern 2900 may be manufactured to be integrated with the moving frame 2000 by injecting a resin material into a mold while the wiring pattern 2900 is disposed in the mold.

In the process of manufacturing the moving frame 2000, the insert injection molding operation may be performed at least twice.

When a pattern width of the wiring pattern 2900 is minimized to reduce its size, the rigidity of the wiring pattern 2900 may not sufficient for the wiring pattern to hold its shape, so it may be difficult to fix the position of the wiring pattern 2900 during the insert injection molding operation.

Therefore, a primary injection-molded product (e.g., a first frame 2700) integrated with the wiring pattern 2900 may be manufactured by a first insert injection molding operation, and then a second injection-molded product (e.g., a second frame 2800) integrated with the primary injection-molded product may be manufactured by a second insert injection molding operation so that the moving frame 2000 having the wiring pattern 2900 partially embedded therein may be manufactured.

Since two insert injection molding operations are performed, a boundary line BL (see FIG. 9) is formed between the first frame 2700, which is the primary injection-molded product, and the second frame 2800, which is the secondary injection-molded product.

Each of the first frame 2700 and the second frame 2800 is made of a plastic material. Also, the plastic material of the first frame 2700 and the plastic material of the second frame 2800 may be the same or different.

A portion of the wiring pattern 2900 may be disposed inside the first frame 2700 and inside the second frame 2800, a portion of the wiring pattern 2900 may be exposed to the outside of the first frame 2700, and a portion of the wiring pattern 2900 may be exposed to the outside of the second frame 2800.

The portion of the wiring pattern 2900 exposed to the outside of the first frame 2700 may be connected to the first coil 3130 and the second coil 3330, and the other portion of the wiring pattern 2900 exposed to the outside of the second frame 2800 may be connected to the sensor substrate 4000.

The first coil 3130, the second coil 3330, the first position sensor 3150, and the second position sensor 3350 are mounted on the first frame 2700, which is the primary injection-molded. product. The first coil 3130, the second coil 3330, the first position sensor 3150, and the second position sensor 3350 are connected to the wiring pattern 2900 that is partially embedded in the first frame 2700.

The wiring pattern 2900 includes a wiring unit 2910 and a terminal unit 2920.

A portion of the wiring unit 2910 is exposed on the upper surface of the moving frame 2000, and the other portion of the wiring unit 2910 is disposed inside the moving frame 2000. The terminal unit 2920 is exposed on the lower surface of the moving frame 2000.

For example, a portion of the wiring unit 2910 is exposed on the upper surface of the first frame 2700 and the other portion of the wiring unit 2910 is disposed inside the first frame 2700. In addition, the other portion of the wiring unit 2910 may extend to the inside of the second frame 2800.

The terminal unit 2920 is exposed to the outside of the first frame 2700. In addition, the terminal unit 2920 is exposed to the outside of the second frame 2800 as well.

Since the terminal unit 2920 of the wiring pattern 2900 is connected to the sensor substrate 4000, power may be applied to the first coil 3130 and the second coil 3330 through the wiring pattern 2900.

Meanwhile, the second frame 2800 is provided with the second guide groove 2100 in which the first ball unit B1 is disposed. The material of the first ball unit B1 may be ceramic, and since the material of the second frame 2800 is plastic, the second guide groove 2100 may be damaged due to a difference in stiffnesses of the two materials.

Therefore, in order to prevent damage to the second guide groove 2100, a support pad 2930 is disposed in the second guide groove 2100, and the support pad 2930 is integrated with the second frame 2800 in the secondary insert injection molding operation.

The support pad 2930 may be embedded inside the second frame 2800, and one surface of the support pad 2930 may be exposed to the outside of the second frame 2800 to contact the first ball unit B1.

The support pad 2930 may be made of a non-magnetic metal material (e.g., stainless steel).

The support pad 2930 may form the bottom surface of the second guide groove 2100. Therefore, the first ball unit B1 may roll in contact with the support pad 2930.

A first yoke 3170 and a second yoke 3370 are disposed inside the moving frame 2000. The first yoke 3170 and the second yoke 3370 generate an attractive force with the first magnet 3110 and the second magnet mounted on the fixed frame 1000 so that the fixed frame 1000 and the moving frame 2000 may be held in contact with the first ball unit B1.

The first yoke 3170 and the second yoke 3370 may be integrated with the first frame 2700 by the primary insert injection molding operation in the same way as the wiring pattern 2900.

The first yoke 3170 and the second yoke 3370 are disposed to face the first magnet 3110 and the second magnet 3310 in the optical axis (Z-axis) direction.

The first coil 3130 and a portion of the wiring pattern 2900 may be positioned between the first magnet 3110 and the first yoke 3170, and the second coil 3130 and another portion of the wiring pattern 2900 may be positioned between the second magnet 3310 and the second yoke 3370.

At least a portion of each of the first yoke 3170 and the second yoke 3370 may be disposed inside the first frame 2700.

An attractive force acts between the first yoke 3170 and the first magnet 3110 and an attractive force acts between the second yoke 3370 and the second magnet 3310 in the optical axis (Z-axis) direction.

Accordingly, since the moving frame 2000 is pressed in a direction toward the fixed frame 1000, the fixed frame 1000 and the moving frame 2000 may be held in contact with the first ball unit B1.

The first yoke 3170 and the second yoke 3370 are made of a material capable of generating the attractive force between the first magnet 3110 and the first yoke 3170 and the attractive force between the second magnet 3310 and the second yoke 3370. For example, the first yoke 3170 and the second yoke 3370 may be made of a magnetic material.

The number of first yokes 3170 and the number of second yokes 3370 is not particularly limited, but an action center point of the attractive force acting between the first magnet 3110 and the second magnet 3310 and the attractive force acting between the first yoke 3170 and the second yoke 3370 needs to be positioned within a support area defined by virtual lines connecting the plurality of balls included in the first ball unit B1 to each other.

Figure 11:
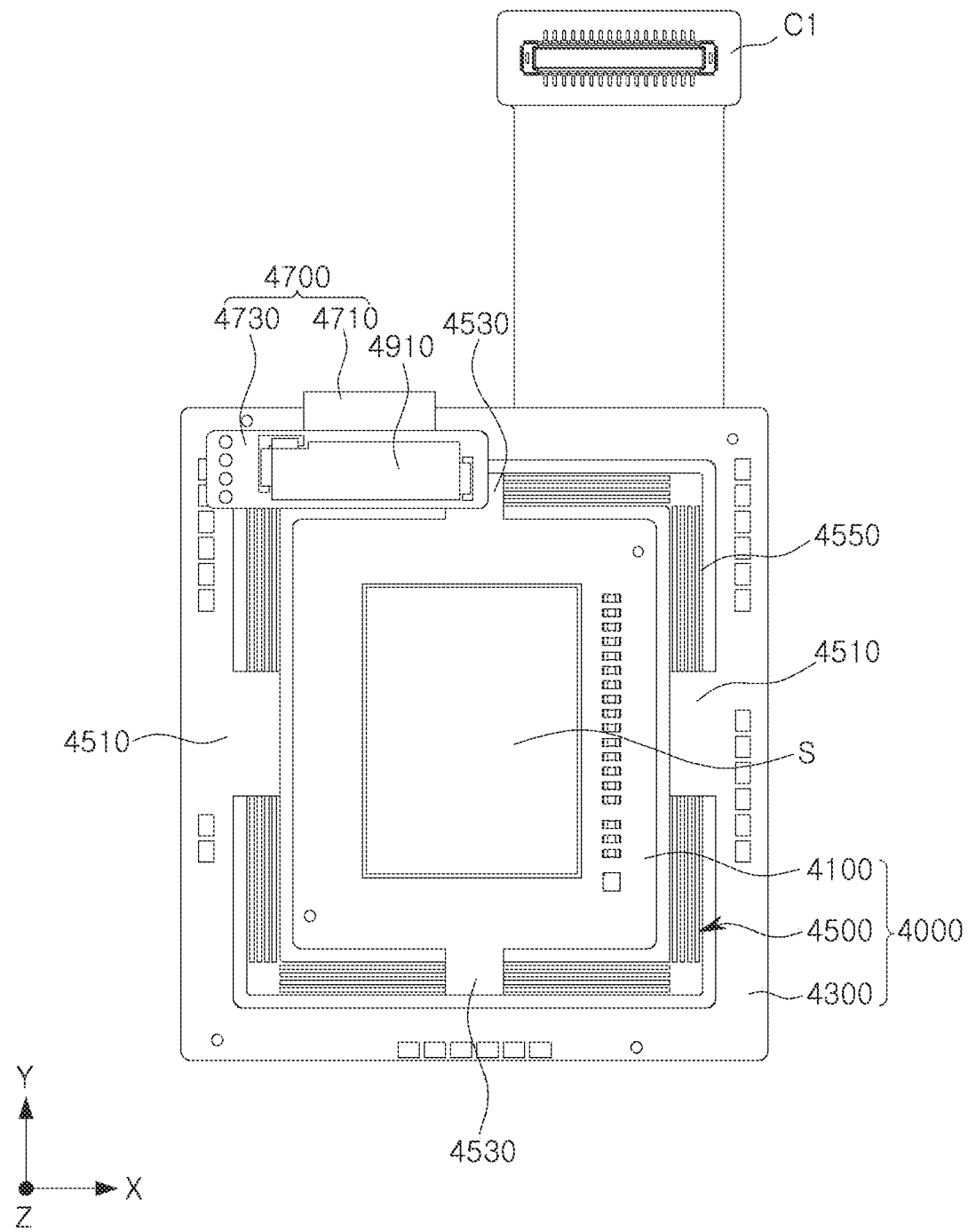
FIGS. 11 and 12 are plan views of a sensor substrate of the first actuator of the camera module of FIG. 1.
Figure 12:
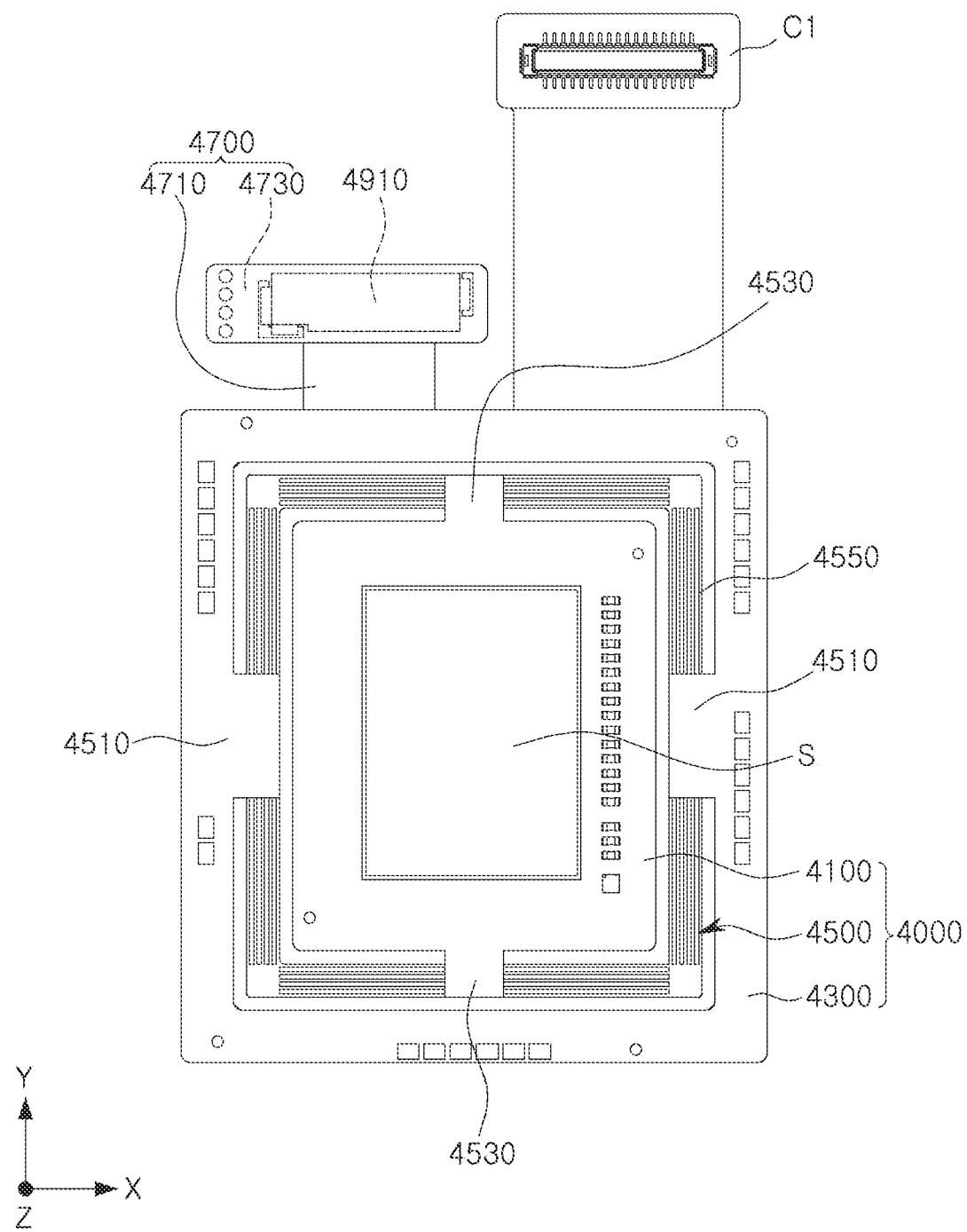
Figure 13:
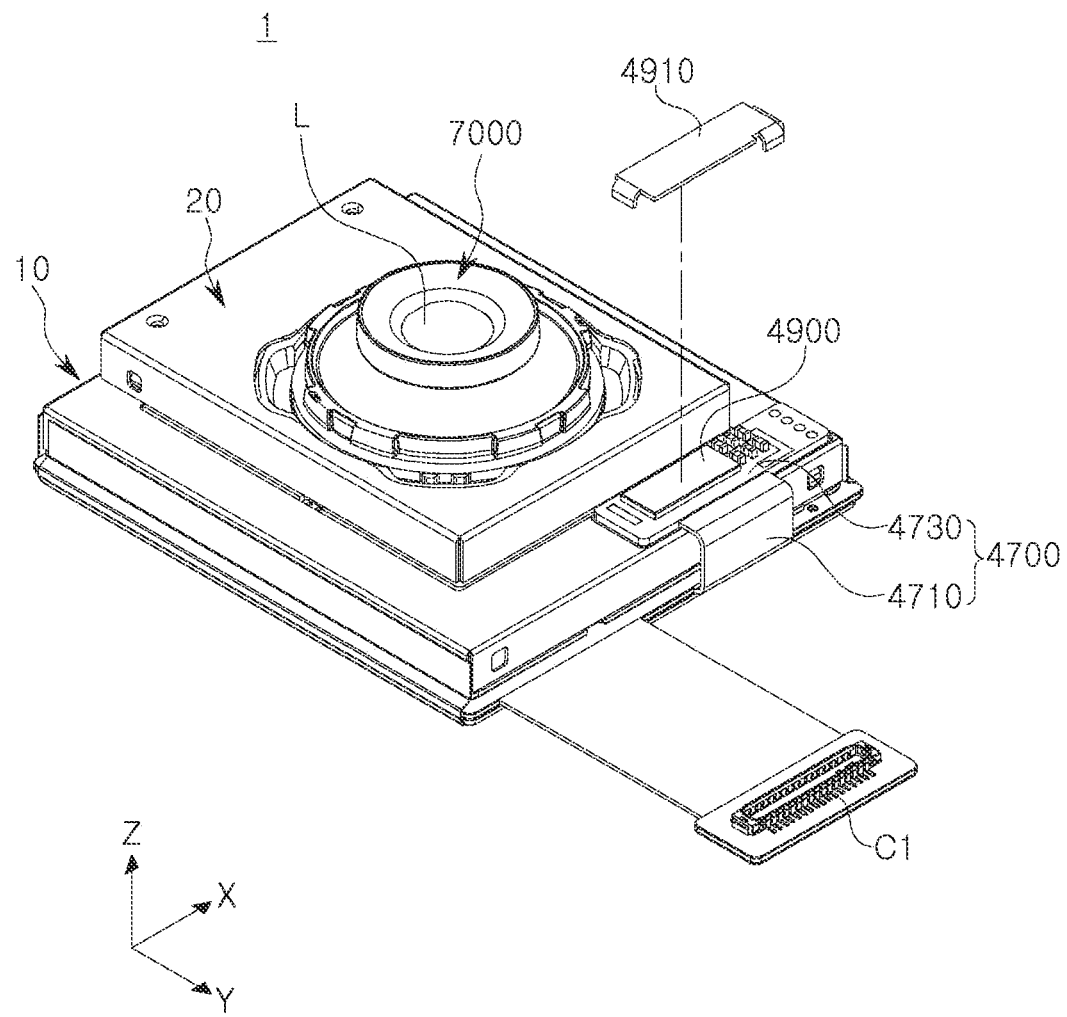
FIGS. 13 and 14 are perspective views illustrating a state in which a control unit is mounted on an extension substrate of FIGS. 11 and 12.
Figure 14:
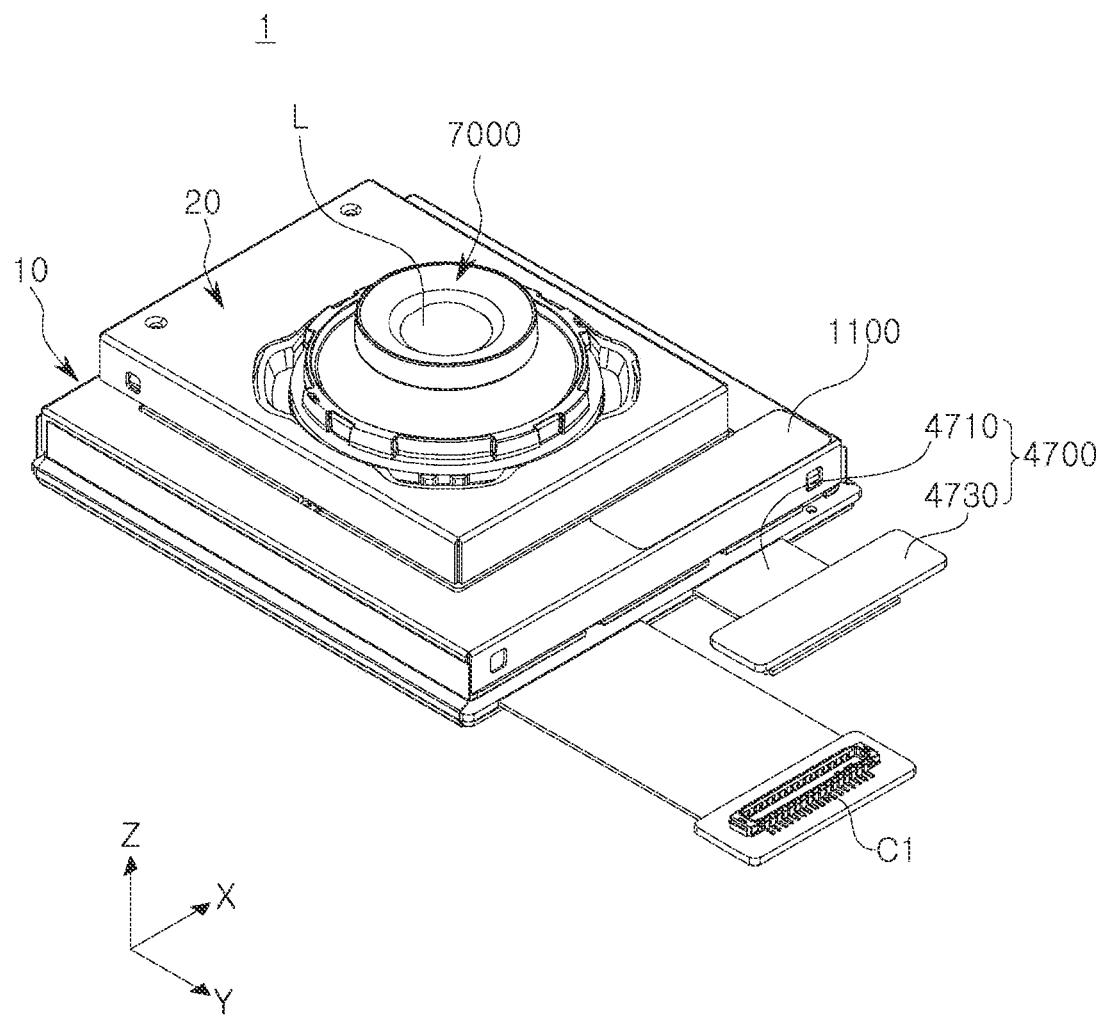

FIGS. 11 and 12 are plan views of a sensor substrate of the first actuator of the camera module of FIG. 1, and FIGS. 13 and 14 are perspective views illustrating a control unit mounted on an extension substrate of FIGS. 11 and 12.

Referring to FIGS. 11 and 12, the sensor substrate 4000 may include a moving part 4100, a fixed part 4300 and a connection part 4500. The sensor substrate 4000 may be a radio-frequency printed circuit board (RF PCB).

The image sensor S is mounted on the moving part 4100. The moving part 4100 is coupled to the lower surface of the moving frame 2000. For example, an area of the moving part 4100 is larger than an area of the image sensor S, and a portion of the moving part 4100 outside the image sensor S may be coupled to the lower surface of the moving frame 2000.

The moving part 4100 is a moving member that is moved together with the moving frame 2000 during the optical image stabilization. The moving part 4100 may be a rigid PCB.

The fixed part 4300 may be spaced apart from the moving part 4100 and may be coupled to the lower surface of the fixed frame 1000. The fixed part 4300 is a fixed member that does not move during the optical image stabilization. The fixed part 4300 may be a rigid PCB.

The connection part 4500 may be disposed between the moving part 4100 and the fixed part 4300, and may connect the moving part 4100 to the fixed part 4300. The connection part 4500 may be a flexible PCB. When the moving part 4100 is moved, the connection part 4500 disposed between the moving part 4100 and the fixed part 4300 may be bent.

The connection part 4500 extends along the circumference of the moving part 4100. The connection part 4500 is provided with a plurality of slits penetrating through the connection part 4500 in the optical axis direction. The plurality of slits are disposed at intervals between the moving part 4100 and the fixed part 4300. Accordingly, the connection part 4500 may include a plurality of bridge elements 4550 spaced apart from each other by the plurality of slits. The plurality of bridge elements 4550 extend along the circumference of the moving part 4100. Each bridge element may have a shape in which the width is thinner than the thickness.

The connection part 4500 includes a first support part 4510 and a second support part 4530. The connection part 4500 is connected to the fixed part 4300 through the first support part 4510. Also, the connection part 4500 is connected to the moving part 4100 through the second support part 4530.

For example, the first support part 4510 is in contact with and connected to the fixed part 4300 and is spaced apart from the moving part 4100. In addition, the second support part 4530 is in contact with and connected to the moving part 4100 and spaced apart from the fixed part 4300.

For example, the first support part 4510 may extend in the first axis direction (X-axis direction) to connect the plurality of bridge elements 4550 of the connection part 4500 to the fixed part 4300. In the embodiment in FIGS. 11 and 12, the first support part 4510 may include two support parts disposed opposite to each other in the first axis direction (X-axis direction).

The second support part 4530 may extend in the second axis direction (Y-axis direction) to connect the plurality of bridge elements 4550 of the connection part 4500 to the moving part 4100. In the embodiment in FIGS. 11 and 12, the second support part 4530 may include two support parts disposed opposite to each other in the second axis direction (Y-axis direction).

Accordingly, the moving part 4100 may be moved in any direction perpendicular to the optical axis (Z-axis) or rotated about the optical axis (Z-axis) while being supported by the connection part 4500.

In an embodiment, when the image sensor S is moved in the first axis direction (X-axis direction), the plurality of bridge elements 4550 connected to the first support part 4510 may be bent. When the image sensor S is moved in the second axis direction (Y-axis direction), the plurality of bridge elements 4550 connected to the second support part 4530 may be bent. Also, when the image sensor S is rotated, the plurality of bridge elements 4550 connected to the first support part 4510 and the plurality of bridge elements 4550 connected to the second support part 4530 may be bent together.

In an embodiment, a length of the fixed part 4300 in the first axis (X-axis) direction and a length of the fixed part 4300 in the second axis (Y-axis) direction may be different from each other. For example, the length of the fixed part 4300 in the second axis (Y-axis) direction may be longer than the length of the fixed part 4300 in the first axis (X-axis) direction. In an embodiment, the sensor substrate 4000 may have a rectangular shape as a whole.

In this type of sensor substrate 4000, when the length of the first support part 4510 and the length of the second support part 4530 are the same, a load applied to the plurality of bridge elements 4550 connected to the first support part 4510 and a load applied to the plurality of bridge elements 4550 connected to the second support part 4530 may be different, and therefore, there may be difficulty in the driving control.

Therefore, by making the length of the first support part 4510 and the length of the second support part 4530 different from each other, the length of the plurality of bridge elements 4550 extending in the second axis (Y-axis) direction from the first support part 4510 and the length of the plurality of bridge elements 4550 extending from the second support part 4530 in the first axis (X-axis) direction may be substantially the same.

Here, the length of the first support part 4510 may mean the length in the second axis (Y-axis) direction, and the length of the second support part 4530 may mean the length in the first axis (X-axis) direction.

Referring to FIGS. 13 and 14, a control unit 4900 for controlling the first driving unit 3000 may be disposed on the sensor substrate 4000. For example, the sensor substrate 4000 may include an extension substrate 4700 on which the control unit 4900 is disposed. The control unit 4900 may be a driver IC.

The extension substrate 4700 may extend from one side of the sensor substrate 4000 and cover a portion of at least one surface of the fixed frame 1000. For example, the extension substrate 4700 may extend from one side of the fixed part 4300 of the sensor substrate 4000, and may cover a portion of one side surface of the fixed frame 1000 and a portion of an upper surface of the fixed frame 1000 adjacent to the one side surface of the fixed frame 1000.

The extension substrate 4700 may include a flexible part 4710 extending from one side of the fixed part 4300 of the sensor substrate 4000 and a mounting part 4730 that is connected to the flexible part 4710 and has the control unit 4900 disposed thereon. For example, the flexible part 4710 may be extended and bent from the sensor substrate 4000 to cover a portion of one side surface of the fixed frame 1000, and the mounting part 4730 may be fixed to the upper surface of the fixed frame 1000.

The control unit 4900 may be disposed on one surface of the mounting part 4730, and another surface of the mounting part 4730 may be coupled to the fixed frame 1000. For example, a groove 1100 may be formed in the upper surface of the fixed frame 1000, and the mounting part 4730 may be coupled to the groove 1100.

A shield can 4910 surrounding at least a portion of the control unit 4900 may be coupled to the mounting part 4730. The shield can 4910 may function to protect the control unit 4900 and shield electromagnetic waves.

The shield can 4910 may be made of a metal and may be grounded to a ground pad provided on the mounting part 4730 to shield the electromagnetic waves.

The first actuator 10 and the camera module 1 do not have a separate printed circuit board for supplying power to the first driving unit 3000, but are configured to supply power to the first driving unit 3000 through the wiring pattern 2900 provided in the moving frame 2000 itself.

Accordingly, the control unit 4900 for controlling the first driving unit 3000 may be disposed on the sensor substrate 4000. However, when the control unit 4900 is disposed on the sensor substrate 4000, the size of the first actuator 10 and the camera module 1 may increase due to the space occupied by the control unit 4900.

Accordingly, the extension substrate 4700 extending from one side of the sensor substrate 4000 is bent and disposed in an empty space of the fixed frame 1000, so it is possible to prevent the sizes of the first actuator 10 and the camera module 1 from increasing.

That is, since at least a part of the extension substrate 4700 is a bendable flexible material, the extension substrate 4700 on which the control unit 4900 is disposed may be disposed on the upper surface of the fixed frame 1000. Therefore, since there is no need to provide a separate installation space for the control unit 4900, the overall size of the first actuator 10 and the camera module 1 may be reduced.

Meanwhile, a first connector C1 to be connected to an external power supply (e.g., a portable electronic device in which the camera module 1 is mounted) may extend from one side of the fixed part 4300 of the sensor substrate 4000.

Meanwhile, referring to FIGS. 2 and 3, a base 5000 may be coupled to a lower portion of the sensor substrate 4000.

The base 5000 may be coupled to the sensor substrate 4000 to cover the lower portion of the sensor substrate 4000. The base 5000 may play a role of preventing external foreign substances from entering through a gap between the moving part 4100 and the fixed part 4300 of the sensor substrate 4000.

A heat dissipation film 5100 may be disposed on a lower portion of the base 5000, and the heat dissipation film 5100 may cover the lower portion of the base 5000 and a side surface of the first actuator 10.

For example, the heat dissipation film 5100 may cover the lower surface of the base 5000, and may further cover either one or both of the side surface of the sensor substrate 4000 and the side surface of the fixed frame 1000 if necessary.

Therefore, heat generated by the image sensor S may be effectively dissipated by the heat dissipation film 5100.

Figure 15:
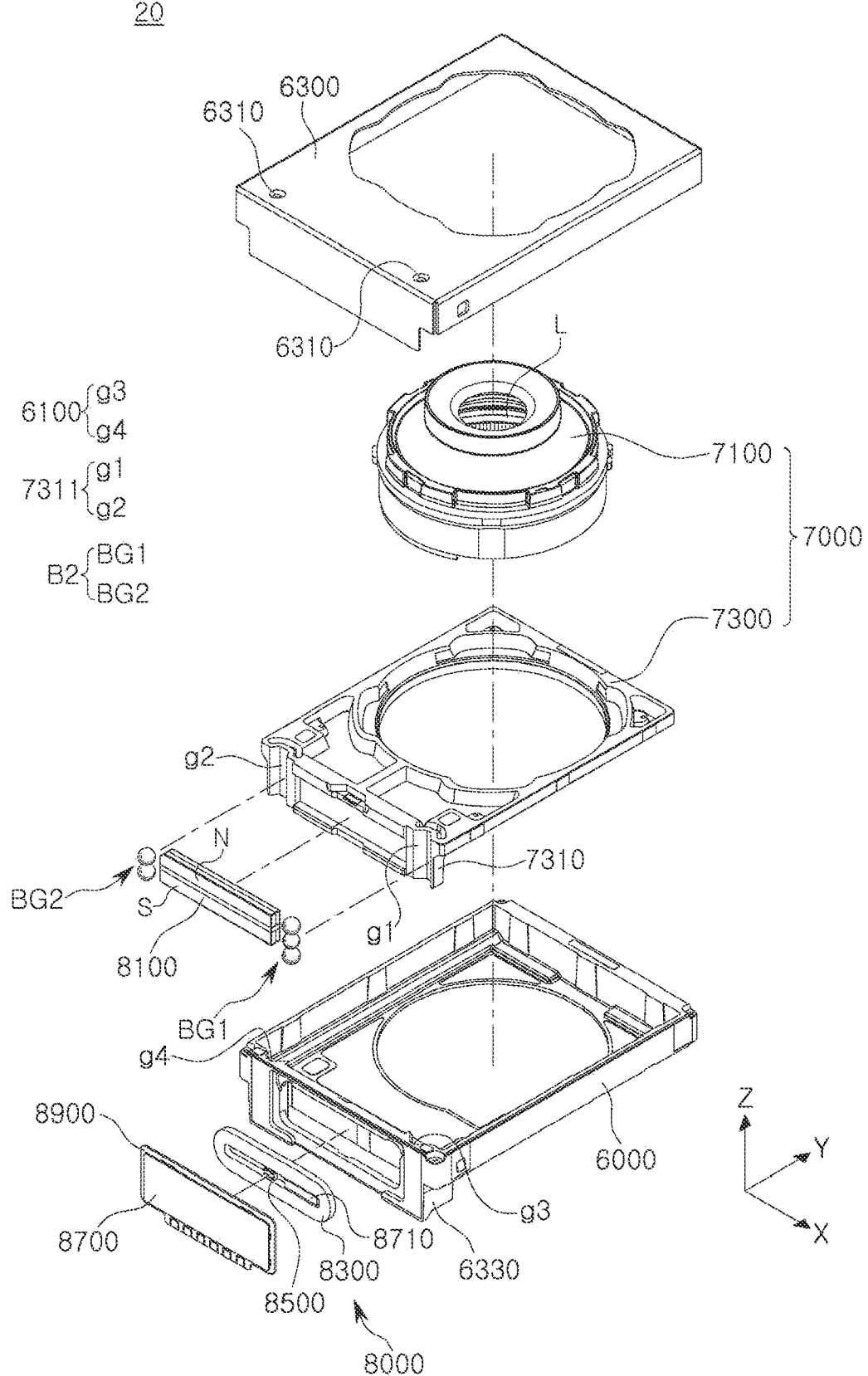
FIG. 15 is an exploded perspective view of a second actuator of the camera module of FIG. 1.
Figure 16:
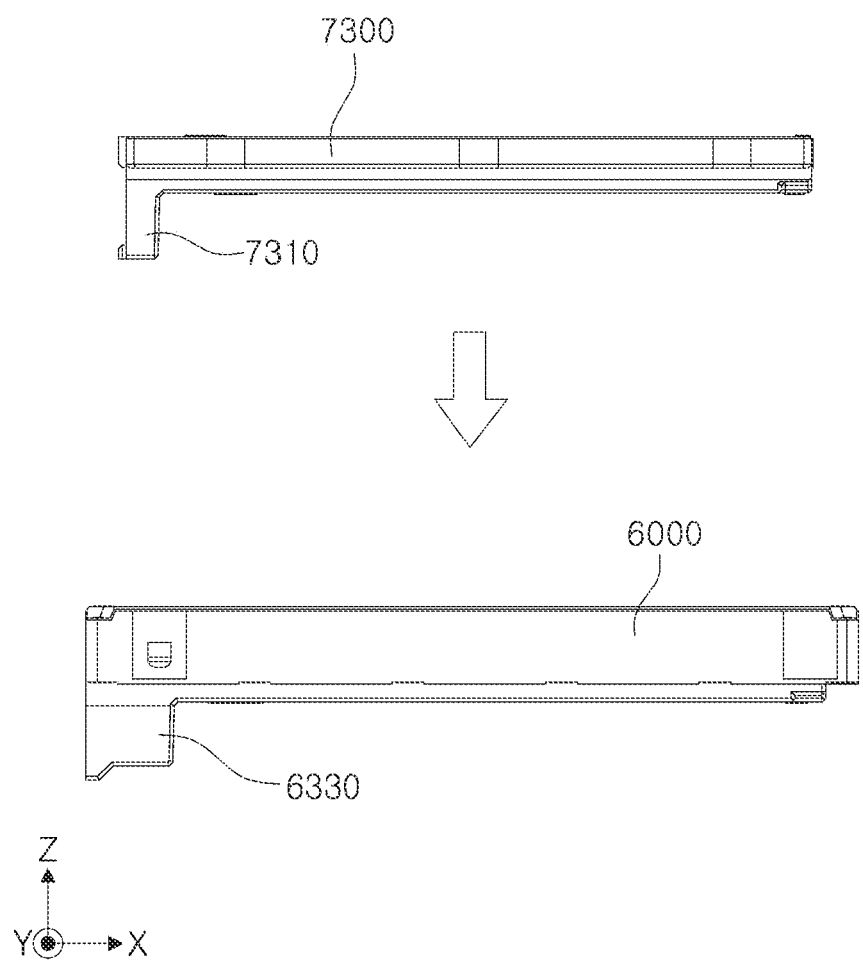
FIG. 16 is a side view of a carrier and a housing of the second actuator of FIG. 15.
Figure 17:
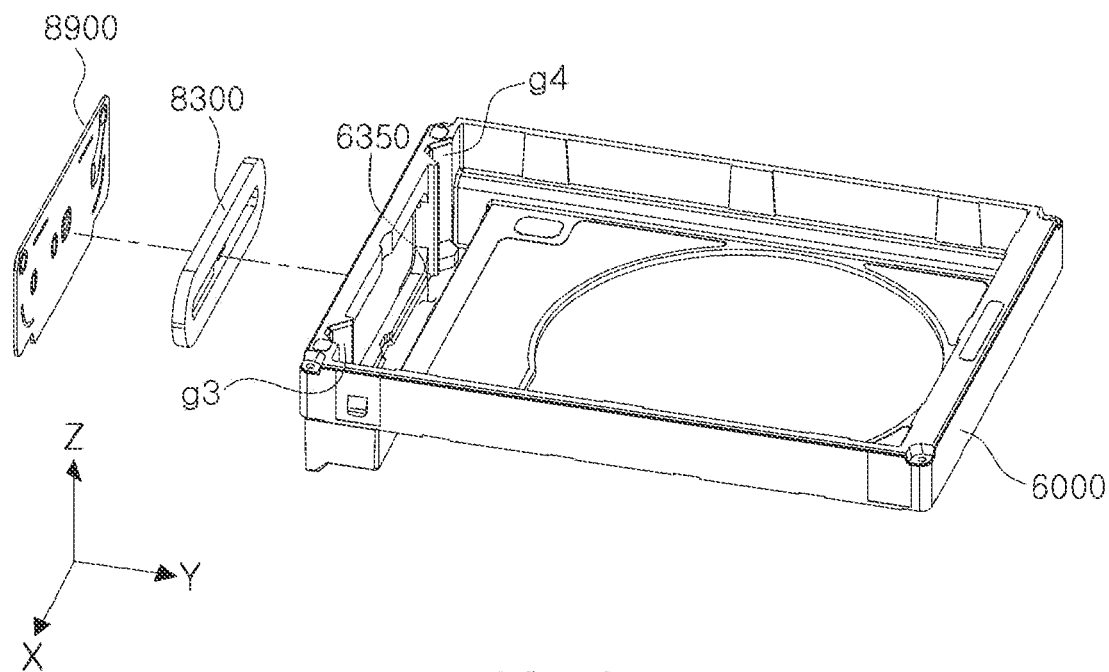
FIG. 17 is a perspective view of the second actuator of FIG. 15.
Figure 18:
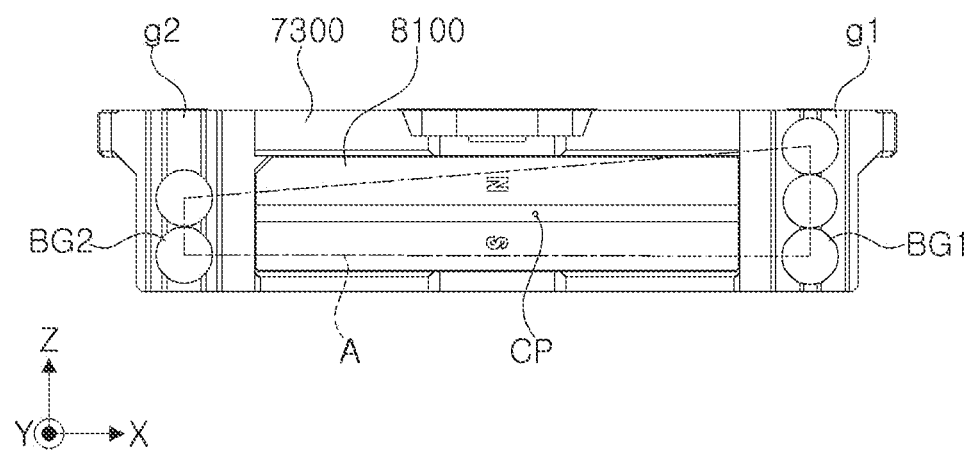
FIG. 18 is a side view of the carrier of the second actuator of FIG. 15.

FIG. 15 is an exploded perspective view of a second actuator of the camera module of FIG. 1, FIG. 16 is a side view of a carrier and a housing of the second actuator of FIG. 15, FIG. 17 is a perspective view of the second actuator of FIG. 15, and FIG. 18 is a side view of the carrier of the second actuator of FIG. 15.

Referring to FIGS. 15 through 18, the second actuator 20 of the camera module 1 of FIG. 1 will be described.

Referring to FIG. 15, the second actuator 20 includes a lens module 7000, a housing 6000, a second driving unit 8000, and a case 6300.

The lens module 7000 includes at least one lens L and a lens barrel 7100. At least one lens L is disposed inside the lens barrel 7100. When a plurality of lenses L are provided, the plurality of lenses L are mounted inside the lens barrel 7100 along an optical axis (Z-axis).

The lens module 7000 may further include a carrier 7300 coupled to the lens barrel 7100.

The carrier 7300 may include opening penetrating through the carrier 7300 in the optical axis (Z-axis) direction, and the lens barrel 7100 is inserted into the opening and fixedly coupled to the carrier 7300. Accordingly, the lens barrel 7100 and the carrier 7300 may be moved together in the optical axis (Z-axis) direction.

The housing 6000 may have an internal space and may have a rectangular box shape with open upper and lower sides. The carrier 7300 is disposed in the internal space of the housing 6000.

The case 6300 may be coupled to the housing 6000 to protect the internal components of the second actuator 20.

The case 6300 may include protrusions 6310 protruding toward a second ball unit B2 to be described later. The protrusions 6310 may serve as stoppers and buffer members that regulate the movement range of the second ball unit B2.

The second driving unit 8000 may generate a driving force in the optical axis (Z-axis) direction to move the carrier 7300 in the optical axis (Z-axis) direction.

The second driving unit 8000 includes a third magnet 8100 and a third coil 8300. The third magnet 8100 and the third coil 8300 may be disposed to face each other in a direction perpendicular to the optical axis (Z-axis) direction, e.g., in the second axis (Y-axis) direction.

The third magnet 8100 may be mounted on the carrier 7300. For example, the third magnet 8100 may be disposed on one side surface of the carrier 7300.

The one side surface of the carrier 7300 on which the third magnet 8100 is disposed may protrude farther in the optical axis (Z-axis) direction than a remaining portion of the carrier 7300. For example, the carrier 7300 may include a first guide part 7310 protruding in the optical axis (Z-axis) direction, and the third magnet 8100 may be disposed on the first guide part 7310.

Accordingly, while providing a sufficient installation space for the second driving unit 8000 to provide a sufficient driving force, a height of the second actuator 20 may be configured to be slim by reducing the height of the remaining portion of the carrier 7300.

A back yoke (not shown) may be disposed between the carrier 7300 and the third magnet 8100. The back yoke may improve the driving force by preventing a magnetic flux of the third magnet 8100 from leaking into the carrier 7300.

One surface (e.g., a surface facing the third coil 8300) of the third magnet 8300 may be magnetized to have both an N pole and an S pole. For example, an N pole, a neutral region, and an S pole may be sequentially arranged on the one surface of the third magnet 8100 facing the third coil

8300 in the optical axis (Z-axis) direction. The third magnet 8100 has a shape having a length in the first axis (X-axis) direction (see FIG. 4)

The other surface (e.g., the opposite surface to one surface) of the third magnet 8100 may be magnetized to have both an S pole and an N pole. For example, an S pole, a neutral region, and an N pole may be sequentially arranged on the other surface of the third magnet 8100 in the optical axis (Z-axis) direction so that the S pole on the other surface opposes the N pole on the one surface, and the N pole on the other surface opposes the S pole on the one surface.

The third coil 8300 is disposed to face the third magnet 8100. For example, the third coil 8300 may be disposed to face the third magnet 8110 in a direction perpendicular to the optical axis (Z-axis) direction, e.g., in the second axis (Y-axis) direction.

The third coil 8300 may be disposed on a substrate 8900, and the substrate 8900 may be disposed on the housing 6000 so that the third magnet 8100 and the third coil 8300 face each other in the direction perpendicular to the optical axis (Z-axis) direction, e.g., in the second axis (Y-axis) direction.

The third magnet 8100 is a moving member that is mounted on the carrier 7300 and moved in the optical axis (Z-axis) direction along with the carrier 7300, and the third coil 8300 is a fixed member that is fixed to the substrate 8900.

When power is applied to the third coil 8300, the carrier 7300 may be moved in the optical axis (Z-axis) direction by an electromagnetic force generated between the third magnet 8100 and the third coil 8300.

Since the lens barrel 7100 is accommodated in the carrier 7300, the lens barrel 7100 may also be moved in the optical axis (Z-axis) direction by the movement of the carrier 7300.

One side surface of the housing 6000 may protrude farther in the optical axis (Z-axis) direction than a remaining portion of the housing 6000. For example, the housing 6000 may include a second guide part 6330 protruding in the optical axis (Z-axis) direction, and the substrate 8900 may be mounted on the second guide part 6330.

As illustrated in FIG. 17, the second guide part 6330 has an accommodation space 6350 for accommodating the first guide part 7310.

Accordingly, while providing a sufficient installation space for the second driving unit 8000 to provide a sufficient driving force, the height of the second actuator 20 may be configured to be slim by reducing the height of the remaining portion of the carrier 6000.

Since the first guide part 7310 of the carrier 7300 and the second guide part 6330 of the housing 6000 protrude in the optical axis (Z-axis) direction, in order to provide an installation space for the first guide part 7310 and the second guide part 6330, clearance area may be provided in the fixed frame 1000 and the moving frame 2000 of the first actuator 10.

That is, as illustrated in FIG. 3, a recess 1510 may be provided in one side of the fixed frame to provide an accommodation space to accommodate the second guide part 6330 having the first guide part 7310 disposed therein.

That is, an installation space for the first guide part 7310 and the second guide part 6330 may be provided by the recess 1510.

Therefore, even if the first guide part 7310 of the carrier 7300 and the second guide part 6330 of the housing 6000 protrude in the optical axis (Z-axis) direction in the second actuator 20, since the protrusions are disposed in the recess 1510 of the first actuator 10, the height of the entire camera module 1 may not increase.

The second ball unit B2 is disposed between the carrier 7300 and the housing 6000. For example, the second ball unit B2 may be disposed between the first guide part 7310 of the carrier 7300 and the second guide part 6330 of the housing 6000. The second ball unit B2 includes a plurality of balls arranged in the optical axis (Z-axis) direction. The plurality of balls may roll in the optical axis (Z-axis) direction when the carrier 7300 is moved in the optical axis (Z-axis) direction.

A third yoke 8700 may be disposed on the housing 6000. The third yoke 8700 is disposed at a position facing the third magnet 8100. For example, the third coil 8300 may be disposed on one surface of the substrate 8900 disposed on the housing 6000, and the third yoke 8700 may be disposed on another surface of the substrate 8900.

An attractive force may be generated between the third magnet 8100 and the third yoke 8700. For example, the attractive force may act in the direction perpendicular to the optical axis (Z-axis) between the third magnet 8100 and the third yoke 8700.

The second ball unit B2 may be held in contact with the carrier 7300 and the housing 6000 by the attractive force of the third magnet 8100 and the third yoke 8700.

Guide grooves may be formed in surfaces of the carrier 7300 and the housing 6000 facing each other in the second axis (Y-axis) direction. For example, a third guide groove 7311 may be formed in the first guide part 7310 of the carrier 7300, and a fourth guide groove 6100 may be formed in the second guide part 6330 of the housing 6000.

The third guide groove 7311 and the fourth guide groove 6100 extend in the optical axis (Z-axis) direction. The second ball unit B2 is disposed between the third guide groove 7311 and the fourth guide groove 6100.

The third guide groove 7311 includes a first groove g1 and a second groove g2, and the fourth guide groove 6100 includes a third groove g3 and a fourth groove g4. Each of the first to fourth guide grooves g1 to g4 has a length extending in the optical axis (Z-axis) direction.

The first groove g1 and the third groove g3 face each other in the second axis (Y-axis) direction perpendicular to the optical axis (Z-axis) direction, and some balls (e.g., a first ball group BG1 to be described later) of the plurality of balls of the second ball unit B2 are disposed in a space between the first groove g1 and the third groove g3.

Among the plurality of balls included in the first ball group BG1, balls disposed at outermost ends of the first ball group BG1 in the optical axis (Z-axis) direction may be in two-point contact with both the first groove g1 and the third groove g3.

The first ball group BG1, the first groove g1, and the third groove g3 may serve as a main guide for guiding the movement of the lens module 7000 in the optical axis (Z-axis) direction.

The second groove g2 and the fourth groove g4 face each other in the second axis (Y-axis) direction perpendicular to the optical axis (Z-axis) direction, and some balls (e.g., a second ball group BG2 to be described later) of the plurality of balls of the second ball unit B2 are disposed in a space between the second groove g2 and the fourth groove g4.

Among the plurality of balls included in the second ball group BG2, the balls disposed at outermost ends of the second ball group BG2 in the optical axis (Z-axis) direction may be in two-point contact with either one of the second groove g2 and the fourth groove g4, and may be in one-point contact with the other one of the second groove g2 and the fourth groove g4.

For example, among the plurality of balls included in the second ball group BG2, the balls disposed at the outermost ends of the second ball group BG2 in the optical axis (Z-axis) direction may be in one-point contact with the second groove g2, and may be in two-point contact with the fourth groove g4. Alternatively, the balls disposed at the outermost ends of the second ball group BG2 in the optical axis (Z-axis) direction may be in two-point contact with the second groove g2, and may be in one-point contact with the fourth groove g4.

The second ball group BG2, the second groove g2, and the fourth groove g4 may serve as an auxiliary guide for supporting the movement of the lens module 7000 in the optical axis (Z-axis) direction.

The second ball unit B2 includes the first ball group BG1 and the second ball group BG2, and the first ball group BG1 and the second ball group BG2 each include a plurality of balls arranged in the optical axis (Z-axis) direction.

The first ball group BG1 and the second ball group BG2 are spaced apart from each other in the first axis (X-axis) direction perpendicular to the optical axis (Z-axis) direction. A number of balls in the first ball group BG1 and a number of balls in the second ball group BG2 may be different from each other (see FIG. 18).

For example, the first ball group BG1 includes three or more balls disposed in the optical axis (Z-axis) direction, and the second ball group BG2 includes a fewer number of balls than the number of balls in the first ball group BG1.

The number of balls in each of the first ball group BG1 and the second ball group BG2 may be changed as long as the number of balls in the first ball group BG1 and the number of balls in the second ball group BG2 are different from each other. Hereinafter, for convenience of description, an embodiment in which the first ball group BG1 includes three balls and the second ball group BG2 includes two balls will be described.

Among the three balls in the first ball group BG1, two balls disposed at the outermost ends of the first ball group BG1 in the optical axis (Z-axis) direction may have a same diameter as each other, and one ball disposed between the two balls may have a diameter smaller than the diameter of the two balls.

For example, among the three balls in the first ball group BG1, the two balls disposed at the outermost ends of the first ball group BG1 in the optical axis (Z-axis) direction have a first diameter, and the one ball disposed between the two balls has a second diameter, wherein the first diameter is larger than the second diameter.

The two balls in the second ball group BG2 may have the same diameter. For example, the two balls in the second ball group BG2 have a third diameter.

The first diameter and the third diameter may be the same. Here, he diameters being the same may mean not only that the diameters are physically the same, but also that the diameters are the same including errors in manufacturing.

The distance between the centers of the balls disposed at the outermost ends of the first ball group BG1 in the optical axis (Z-axis) direction may be different from the distance between the centers of the balls disposed at the outermost ends of the second ball group BG1 in the optical axis (Z-axis) direction.

For example, the distance between the centers of the two balls having the first diameter in the first ball group BG1 is greater than the distance between the centers of the two balls having the third diameter in the second ball group BG2.

When the carrier 7300 is moved in the optical axis (Z-axis) direction, in order for the carrier 7300 to move parallel to the optical axis (Z-axis) direction (i.e., in order to prevent the carrier 7300 from tilting), an action center point CP of the attractive force generated between the third magnet 8100 and the third yoke 8700 needs to be positioned in a support area A defined by lines connecting the contact points where the second ball unit B2 contacts the carrier 7300 (or the housing 6000).

When the action center point CP of the attractive force is outside the support area A, the position of the carrier 7300 may be deviated while the carrier 7300 moves, which may cause the carrier 7300 to tilt. Therefore, it is necessary to make the support area A as wide as possible.

In an embodiment in the present disclosure, the diameters of some of the plurality of balls of the second ball member B2 are intentionally made to be smaller than the sizes (e.g., the diameters) of the other balls. In this case, the larger balls among the plurality of balls may intentionally come into contact with the carrier 7300 and the housing 6000.

Referring to FIG. 18, since the diameters of two of the three balls of the first ball group BG1 are larger than the diameter of the remaining one ball of the first ball group BG1, the two balls of the first ball group BG1 come into contact with carrier 7300 and the housing 6000. Also, since the two balls of the second ball group BG2 have the same diameter, the two balls of the second ball group BG2 come into contact with the carrier 7300 and the housing 6000.

Accordingly, as illustrated in FIG. 18, when viewed in the second axis (Y-axis) direction, the second ball unit B2 is in four-point contact with the carrier 7300 and the housing 6000. Also, the support area A defined by lines connecting the contact points to each other may have a rectangular shape (e.g., trapezoidal shape).

Therefore, the support area A may be relatively wide, and thus the action center point CP of the attractive force generated between the third magnet 8100 and the third yoke 8700 may be stably positioned within the support area A. Therefore, a driving stability during the focus adjustment may be ensured.

Meanwhile, even if the two balls of the second ball group BG2 are manufactured to have the same diameter, the two balls of the second ball group BG2 may not physically have exactly the same diameter due to errors in manufacturing. In this case, either one of the two balls of the second ball group BG2 may come into contact with the carrier 7300 and the housing 6000.

Accordingly, the support area A connecting the contact points where the second ball unit B2 contacts the carrier 7300 and the housing 6000 may have a triangular shape (not shown).

Even if the support area A has a triangular shape, since the support area A may be formed to be wide by the balls disposed the outermost ends of the first ball group BG1 in to the optical axis (Z-axis) direction among the three balls of the first ball group BG1, it is possible to ensure the driving stability during the focus adjustment.

Apart from ensuring the driving stability during the focus adjustment, it is important to reduce (i.e. slim) the height of the camera module 1 in the optical axis (Z-axis) direction. When simply reducing the height of the camera module 1 in the optical axis (Z-axis) direction, the height of the support area A in the optical axis (Z-axis) direction may also be reduced.

Therefore, when simply reducing the height of the camera module 1 in the optical axis (Z-axis) direction, there is a concern that a problem may occur in the driving stability during the focus adjustment.

Accordingly, in the camera module 1 of FIG. 1, the third groove g3 and the fourth groove g4 may have different lengths in the optical axis (Z-axis) direction. For example, the length of the third groove g3 in the optical axis (Z-axis) direction may be longer than the length of the fourth groove g4 in the optical axis (Z-axis) direction.

In an embodiment in the present disclosure, the number of balls in the first ball group BG1 is different from the number of balls in the second ball group BG2, and by making lengths in the optical axis (Z-axis) direction of the spaces where the first and second ball groups BG1 and BG2 are accommodated different from each other, it is possible to prevent the size of the support area A from changing or to prevent the action center point CP of the attractive force from departing from the support area A even when the size of the support area A is changed.

In addition, the size of the support area A may be increased by configuring the length of the third groove g3 of the main guide to be longer than the length of the fourth groove g4 of the auxiliary guide.

Meanwhile, in an embodiment in the present disclosure, an auxiliary yoke 8710 may be disposed at a position facing the third magnet 8100. For example, the auxiliary yoke 8710 may be disposed on the substrate 8900 facing the third magnet 8100.

The auxiliary yoke 8710 may be positioned closer to the main guide consisting of the first ball group BG1, the first groove g1, and the third groove g3 than to the auxiliary guide consisting of the second ball group BG2, the second groove g2, and the fourth groove g4. The auxiliary yoke 8710 is made of a material capable of generating an attractive force with the third magnet 8100.

Therefore, the resultant force of the attractive force generated between the third magnet 8100 and the third yoke 8700 and the attractive force generated between the third magnet 8100 and the auxiliary yoke 8710 may be positioned closer to the main guide than to the auxiliary guide.

Since the length of the support area A in the optical axis (Z-axis) direction increases as a position in the support area A in the first axis (X-axis) direction approaches the main guide, the resultant attractive force of the attractive forces between the third magnet 8100, the third yoke 8700, and the auxiliary yoke 8710 is disposed closer to the main guide than to the auxiliary guide, so the action center point CP of the resultant attractive force may be more stably positioned within the support area A.

In another embodiment in the present disclosure, the third magnet 8100 may be disposed so that the action center point CP of the attractive force generated between the third yoke 8700 and the third magnet 8100 is positioned closer to the main guide than to the auxiliary guide.

For example, on the one side surface of the carrier 7300, the third magnet 8100 may be disposed eccentrically to one side in the longitudinal direction (e.g., the first axis (X-axis) direction of the third magnet 8100.

The center of the one side surface of the carrier 7300 and the center of the third magnet 8100 may be misaligned. The direction in which the third magnet 8100 is eccentric may be toward the main guide.

That is, the third magnet 8100 may be disposed closer to the main guide than to the auxiliary guide.

Meanwhile, the second actuator 20 may detect the position of the carrier 7300 in the optical axis (Z-axis) direction. For this purpose, a third position sensor 8500 is provided. The third position sensor 8500 is disposed on the substrate 8900 facing the third magnet 8100. The third position sensor 8500 may be a Hall sensor.

In the camera module 1 of FIG. 1, the lens module 7000 is configured to be movable in the optical axis (Z-axis) direction during the autofocus adjustment, and the image sensor S is configured to be movable in a direction perpendicular to the optical axis (Z-axis) direction during the optical image stabilization.

Therefore, even if the lens module 7000 is moved in the optical axis (Z-axis) direction during the focus adjustment, the relative positions of the magnets and coils of the first driving unit 3000 do not change, so the driving force for the optical image stabilization may be precisely adjusted.

In addition, even if the image sensor S is moved in the direction perpendicular to the optical axis during the optical image stabilization, the relative position of the magnet and coil of the second driving unit 8000 does not change, so it is possible to precisely control the driving force for the focus adjustment.

The actuator for optical image stabilization according to an embodiment in the present disclosure and a camera module including the actuator may improve optical image stabilization performance.

While this disclosure includes specific examples, it will be apparent that after an understanding of the disclosure of this application that various changes in form and details may be made in these examples without departing from the spirit and scope of the claims and their equivalents. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An actuator for optical image stabilization, the actuator comprising:
 a fixed frame having an internal space;
 a moving frame disposed in the internal space of the fixed frame and configured to be movable relative to the fixed frame;
 a first driving unit comprising a plurality of magnets disposed on the fixed frame, and a plurality of coils disposed on the moving frame and configured to be movable together with the moving frame relative to the fixed frame; and
 a sensor substrate comprising:
  a moving part coupled to the moving frame and configured to be movable together with the moving frame relative to the fixed frame; and
  an extension substrate extending from one side of the sensor substrate and covering a portion of at least one surface of the fixed frame,
 wherein an image sensor is disposed on the moving part of the sensor substrate, and
 a control unit is disposed on a portion of the extension substrate covering the portion of the at least one surface of the fixed frame.

2. The actuator of claim 1, wherein the extension substrate comprises:
 a flexible part extending from the one side of the sensor substrate; and
 a mounting part connected to the flexible part, wherein the control unit is disposed on one surface of the mounting part, and
another surface of the mounting part on an opposite side of the mounting part from the one surface is coupled to the portion of the at least one surface of the fixed frame.

3. The actuator of claim 2, wherein the portion of the at least one surface of the fixed frame comprises a groove, and the other surface of the mounting part is coupled to the groove.

4. The actuator of claim 2, wherein a shield can surrounding at least a portion of the control unit is coupled to the one surface of the mounting part.

5. The actuator of claim 1, wherein the sensor substrate further comprises a fixed part spaced apart from the moving part and coupled to the fixed frame, and
the extension substrate extends from one side of the fixed part of the sensor substrate.

6. The actuator of claim 1, further comprising:
a first ball unit disposed between the fixed frame and the moving frame; and
a plurality of yokes facing the plurality of magnets disposed on the moving frame,
wherein at least a portion of each of the plurality of yokes is disposed inside the moving frame.

7. The actuator of claim 1, further comprising a first ball unit disposed between the fixed frame and the moving frame,
wherein the moving frame comprises a first frame in which the plurality of coils are disposed, and a second frame in which the first ball unit is disposed, and
the first frame and the second frame are made of a same plastic material or different plastic materials.

8. The actuator of claim 7, further comprising a wiring pattern disposed inside the moving frame,
wherein a portion of the wiring pattern is connected to the plurality of coils, and
another portion of the wiring pattern is exposed to an outside of the second frame and is connected to the sensor substrate.

9. The actuator of claim 7, further comprising a support pad made of a material different from a material of the second frame and disposed inside the second frame,
wherein one surface of the support pad is exposed to an outside of the second frame and contacts the first ball unit.

10. The actuator of claim 1, wherein the first driving unit comprises:
a first sub-driving unit configured to generate a driving force in a first axis direction parallel to an imaging surface of the image sensor; and
a second sub-driving unit configured to generate a driving force in a second axis direction perpendicular to the first axis direction and parallel to the imaging surface of the image sensor,
the first sub-driving unit comprises a first magnet disposed on the fixed frame, and a first coil disposed on the moving frame, and
the second sub-driving unit comprises a second magnet disposed on the fixed frame, and a second coil disposed on the moving frame.

11. The actuator of claim 10, wherein either one or both of the first magnet and the second magnet comprises two magnets,
either one or both of the first coil and the second coil comprises two coils, and
the actuator further comprises two position sensors disposed at positions facing the two magnets.

12. The actuator of claim 1, wherein the sensor substrate further comprises:
a fixed part coupled to the fixed frame; and
a connection part connecting the moving part to the fixed part, and
the connection part extends along a circumference of the moving part and comprises a plurality of bridge elements spaced apart from each other.

13. The actuator of claim 12, wherein the connection part further comprises a first support part and a second support part,
one side of the first support part is connected to the moving part and another side of the first support part is spaced apart from the fixed part, and
one side of the second support part is connected to the fixed part and another side of the second support part is spaced apart from the moving part.

14. A camera module comprising:
a housing having an internal space;
a lens module disposed in the internal space of the housing and disposed to be movable in an optical axis direction of the camera module;
a fixed frame coupled to the housing and having a size larger than a size of the housing in a direction perpendicular to the optical axis direction;
a moving frame configured to be movable relative to the fixed frame in a direction perpendicular to the optical axis direction;
a first ball unit disposed between the fixed frame and the moving frame;
a first driving unit comprising a plurality of magnets disposed on the fixed frame, and a plurality of coils disposed on the moving frame and configured to movable together with the moving frame relative to the fixed frame; and
a sensor substrate comprising:
a moving part having an image sensor disposed thereon and coupled to the moving frame;
a fixed part spaced apart from the moving part and coupled to the fixed frame; and
an extension substrate having a control unit disposed therein and extending from the fixed part of the sensor substrate and covering a portion of at least one surface of the fixed frame.

15. The camera module of claim 14, wherein the extension substrate comprises a flexible part extending from the fixed part, and a mounting part connected to the flexible part and on which the control unit is disposed,
the mounting part is coupled to the fixed frame, and a shield can surrounding at least a portion of the control unit is coupled to the mounting part, and
the control unit is a driver IC.

16. The camera module of claim 14, wherein the plurality of coils and the sensor substrate are electrically connected to each other by a wiring pattern disposed inside the moving frame.

17. The camera module of claim 14, wherein the lens module comprises a first guide unit protruding in the optical axis direction,
the housing comprises a second guide part protruding in the optical axis direction and accommodating the first guide part,
a second ball unit is disposed between surfaces of the first guide part and the second guide part facing in a direction perpendicular to the optical axis direction, and the fixed frame comprises a recess in which the second guide part is disposed.

18. An actuator for optical image stabilization, the actuator comprising:
a fixed frame having an internal space;
a moving frame disposed in the internal space of the fixed frame and configured to be movable relative to the fixed frame;
a first driving unit comprising a plurality of magnets disposed on the fixed frame, and a plurality of coils disposed on the moving frame and configured to be movable together with the moving frame relative to the fixed frame; and
a sensor substrate opposing the fixed frame in an optical axis direction and comprising:
a moving part having an image sensor disposed thereon, coupled to the moving frame, and configured to be movable together with the moving frame relative to the fixed frame; and
an extension substrate having a control unit disposed thereon, extending from one side of the sensor substrate in one direction perpendicular to the optical axis direction, and bent to cover a portion of one side surface of the fixed frame extending in a direction parallel to the optical axis direction, and so that a portion of the extension substrate on which the control unit is disposed covers a portion of another surface of the fixed frame.

19. The actuator of claim 18, wherein the extension substrate is further bent to extend in a direction opposite to the one direction perpendicular to the optical axis direction so that the portion of the extension substrate on which the control unit is disposed covers a portion of a surface of the fixed frame that is perpendicular to the optical axis direction and is adjacent to the portion of the one side surface of the fixed frame covered by the extension substrate.

20. The actuator of claim 19, wherein the control unit is disposed on a portion of the extension substrate covering the portion of the surface of the fixed frame that is perpendicular to the optical axis direction, and
the portion of the extension substrate on which the control unit is mounted is coupled to the portion of the surface of the fixed frame that is perpendicular to the optical axis direction.

21. The actuator of claim 18, wherein the first driving unit comprises:
a first sub-driving unit configured to generate a driving force in a first axis direction parallel to an imaging surface of the image sensor; and
a second sub-driving unit configured to generate a driving force in a second axis direction perpendicular to the first axis direction and parallel to the imaging surface of the image sensor,
the first sub-driving unit comprises a first magnet disposed on the fixed frame, and a first coil disposed on the moving frame, and
the second sub-driving unit comprises a second magnet disposed on the fixed frame, and a second coil disposed on the moving frame, and
the control unit is configured to control the first sub-driving unit and the second sub-driving unit to perform the optical image stabilization.

* * * * *